(12) United States Patent
Farrell

(10) Patent No.: US 11,495,965 B2
(45) Date of Patent: Nov. 8, 2022

(54) SITE MANAGEMENT SYSTEMS AND METHODS

(71) Applicant: TechSouth Solutions, LLC, Owens Cross Roads, AL (US)

(72) Inventor: John Eric Farrell, Owens Cross Roads, AL (US)

(73) Assignee: TechSouth Solutions, LLC, Huntsville, AL (US)

( * ) Notice: Subject to any disclaimer, the term of this patent is extended or adjusted under 35 U.S.C. 154(b) by 126 days.

(21) Appl. No.: 17/170,213

(22) Filed: Feb. 8, 2021

(65) Prior Publication Data
US 2021/0167599 A1    Jun. 3, 2021

Related U.S. Application Data

(63) Continuation-in-part of application No. 15/379,865, filed on Dec. 15, 2016, now abandoned.

(51) Int. Cl.
*H02J 3/00* (2006.01)
*H02J 3/28* (2006.01)

(52) U.S. Cl.
CPC .............. *H02J 3/003* (2020.01); *H02J 3/007* (2020.01); *H02J 3/28* (2013.01)

(58) Field of Classification Search
None
See application file for complete search history.

(56) References Cited

U.S. PATENT DOCUMENTS

| | | | |
|---|---|---|---|
| 6,965,294 B1 * | 11/2005 | Elliott | G07C 9/00896 235/382 |
| 6,995,657 B2 | 2/2006 | Zalitzky et al. | |

(Continued)

FOREIGN PATENT DOCUMENTS

CN    202956838 U    5/2013

OTHER PUBLICATIONS

James Niccolai, Power Company Plugs Data Center Directly into High Voltage Grid, Network World, Dec. 8, 2014, http://www.networkworld.com/article/2856793/power-company-plugs-data-center-directly-into-highvoltage-grid.html, United States.

(Continued)

*Primary Examiner* — Alan Torrico-Lopez
(74) *Attorney, Agent, or Firm* — Dennen IP Law, LLC

(57) ABSTRACT

A site management system has a site management device located on a fielded site, which has a controller unit integral with a power provision unit, and the power provision unit receives an input voltage via a conductor cable and delivers power to one or more receptacles. Additionally, the system has a plurality of remote devices communicatively coupled to the site management device over a wireless network and at least one off-site computing device communicatively coupled to the site management device. Further, the system has a processor on the controller unit that communicatively couples with at least one remote device, receives data indicative of a unique identifier from the wireless remote device, and determines whether the unique identifier correlates with a remote device of an individual who is permissively on the fielded site. In addition, the processor transits data indicative of the individual and data indicative of whether the individual is permissively on the fielded site to the off-site computing device or a site manager's remote device.

47 Claims, 12 Drawing Sheets

(56) References Cited

U.S. PATENT DOCUMENTS

| | | | |
|---|---|---|---|
| 7,071,839 B2 | 7/2006 | Patel et al. | |
| 7,453,373 B2 | 11/2008 | Cumeralto et al. | |
| 7,513,683 B2 | 4/2009 | Sanderford et al. | |
| 7,738,612 B2 | 6/2010 | Rafaeli | |
| 8,140,414 B2 | 3/2012 | O'Neil et al. | |
| 9,424,545 B1* | 8/2016 | Lee | G06Q 10/063114 |
| 10,021,106 B1* | 7/2018 | Saylor | G06Q 10/06 |
| 2003/0014757 A1 | 1/2003 | Craven et al. | |
| 2003/0218549 A1 | 11/2003 | Logvinov et al. | |
| 2008/0316004 A1 | 12/2008 | Kiko | |
| 2010/0321473 A1* | 12/2010 | An | H04N 5/2628 |
| | | | 348/47 |
| 2011/0298301 A1 | 12/2011 | Wong et al. | |
| 2013/0226546 A1* | 8/2013 | Suyeyasu | G06Q 50/08 |
| | | | 703/6 |
| 2014/0114824 A1* | 4/2014 | Kong | G06Q 10/1091 |
| | | | 705/32 |
| 2014/0240125 A1* | 8/2014 | Burch | B25H 3/02 |
| | | | 340/539.13 |
| 2015/0229697 A1* | 8/2015 | Grobelny | G06F 3/04817 |
| | | | 715/748 |
| 2015/0294431 A1* | 10/2015 | Fiorucci | G07B 15/02 |
| | | | 705/13 |
| 2016/0189531 A1* | 6/2016 | Modi | G08B 29/188 |
| | | | 340/506 |
| 2017/0344918 A1* | 11/2017 | McMillon | G06Q 10/0633 |

OTHER PUBLICATIONS

Hannu Pihala, Non-intrusive Appliance Load Monitoring System Based on a Modern kWh-meter, May 1998, Technical Research Centre of Finland, VTT Publications 356, Espoo, Finland.

Toshihiko Samama, Takao Kawamura, Kazunori Sugahara, Controlable Electrical Power Plug Adapters Made as a ZigBee Wireless Sensor Network, World Academy of Science, Engineering and Technology 71, 2012, pp. 840-843, http://search.proquest.com/openviewer/714c48f07208384d5b22fd94ae380fff/1?pq-origsite=gscholar.

* cited by examiner

SITE MANAGEMENT SYSTEMS AND METHODS

CROSS REFERENCE TO RELATED APPLICATION

This application is a continuation-in-part of and claims priority to U.S. patent application Ser. No. 15/379,865 entitled Site Management Systems and Methods and filed on Dec. 15, 2016, which is incorporated herein by reference.

BACKGROUND

A construction site is where laborers and groups of laborers work to erect a structure. At some construction sites, the laborers work to build a residence or the laborers work to build a commercial building. Regardless, it takes laborers and groups of laborers with many different skills to complete the work. Additionally, the job takes other entities, for example vendors or inspectors, to complete the job.

As an example, some construction sites use foundation specialists for pouring a foundation for the structure. Another group of laborers may build the frame for the structure, and another group may build the outside of the structure, which may include brick or wood. Additionally, a group of laborers may construct the inside of the structure, which includes the wallboards and trim. Roofers may finish off the structure by applying roofing tiles to the top of the structure. Further, there may be plumbers, electricians, and the like that build the plumbing infrastructure and wire the house for electricity, respectively. In addition, landscape professionals may be used to finish off the exterior of the structure with grass, bushes, trees, plants, or the like.

At most construction sites there is a general contractor, who may have or be a site manager, which is responsible for managing the entire project of building the structure. The site manager is responsible for many challenging tasks during the course of the job, which includes preparation of the site, building the structure, ordering needed goods or services necessary for building the structure, ensuring that the structure meets code, etc.

In this regard, laborers may need a power source to which the laborers may connect their tools, and the site manager is responsible for ensuring this need is met. Oftentimes, this is accomplished by a temporary electric meter that supplies power from a main power line, typically from a public utility, through an electrical meter to the laborer's tools.

Further, the site manager may desire to discuss issues with one or a group of laborers. This means that the site manager may be required to physically go to the site to discuss the issue with the laborers. As an example, the plans for the structure may require a modification related to one of the structure components. The site manager is responsible for communicating this modification to the laborers.

In addition, there are other tasks that involve communication with other entities, including vendors and inspectors. In regards to vendors, the site manager may need to order goods or services from a vendor and receive goods or services at the fielded site. For example, a vendor may supply concrete for the foundation, wood for the framing, brick or wood for the external portion of the structure, roofing tiles, plumbing fixtures, electrical components, or the like. The site manager communicates with the vendor to order the goods or services and again when the goods or services delivered. This may require the site manager to have to be physically at the fielded site (or at a vendor's place of business) to place the order, or it may require the site manager to be physically at the fielded site to take delivery. This can be a cumbersome and time expensive task.

Notably, construction sites are notorious for theft of goods that are delivered to the fielded site. In this regard, the fielded site needs to be more secure to ensure that theft does not take place on the fielded site. Theft on a construction site affects the cost of the job, which the site manager is responsible for handling.

Further, the site manager communicates with inspectors regarding the integrity of the many components of the structure. As an example, an inspector may inspect the foundation, the framing, the external components, the internal components, the plumbing or the electricity to ensure that it meets particular standards. Oftentimes, inspectors come to the fielded site, inspect the particular component, and record the various tasks related to the inspection. Some inspectors use an electronic device to record the inspection results. The site manager is responsible for receiving the inspection results and responding to and quickly correcting any deficiencies that are found. This requires the site manager to communicate with the inspectors. This process may be time consuming, which causes an increase in the amount of time and money invested in the job.

There is often a lag in the inspection process. In this regard, an inspector comes to the fielded site and performs an inspection. Once performed, the inspection results are to be provided to the inspections central office. Thus, currently there is a potential lag between when the inspection is completed and when the general contractor actually receives the results of the inspection.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1A:
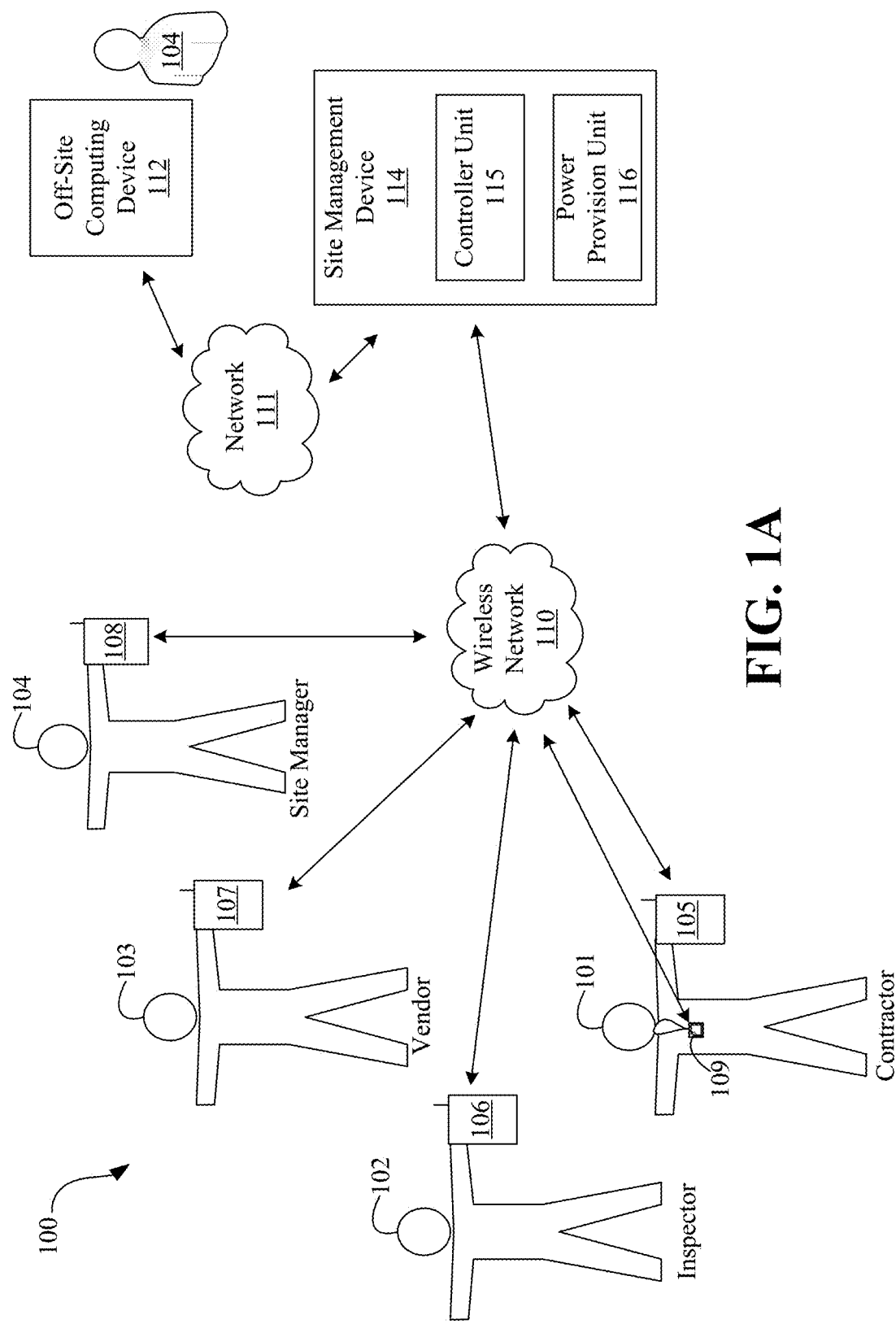
FIG. 1A is a block diagram of an exemplary site management system in accordance with an embodiment of the present disclosure.

The present disclosure describes a portable site management system configured for providing services to a fielded site. Further, the portable site management device is configured to be a unitary component secured temporarily on a first fielded construction site and configured to be moved to a second fielded construction site upon completion of a build on the first fielded construction site.

An exemplary fielded site includes, but is not limited to, a construction site of a residence, a construction site of a commercial building, and the like. The system may be installed at the fielded site via surface mount, pedestal, or a structure. Other types of fielded sites may include disaster sites, concerts, accident sites, and deployment sites for the military. In one embodiment, the site management system provides power to the site. In this regard, the site management system receives voltage/current input from a public utility, private utility or live power source. The resulting power is typically metered and provided to receptacles and a controller unit for operation. In this regard, the controller is integral, i.e., in the same housing, with a temporary metered power provision unit connected to a split-phase 240/120-volt entrance via a conductor cable from an electric utility, which delivers power to a distributive load center for energizing multiple circuits. The distributive load center energizes multiple circuits. The distributive load center is integral with the controller unit, and the temporary metered power provision unit, i.e., compartmentalized in the same housing. The distributive load center is configured to provide power to one or more receptacles to provide power to power tools in use by workers on the fielded site.

Note that the site management system is portable. The site management system is erected at a fielded site on which a build is to occur. The site management system remains on the fielded site through the final construction phase, remodel construction phase, and marketing phase of an erected but unoccupied building. After completion on the fielded site, the site management system is moved to another fielded site.

The site management system may be utilized during the permanent electric service phase and during the final construction phase, remodeling phase and marketing phase of a dwelling whereas the site management device located in a construction site dwelling. In this regard, the site management system comprises a controller unit integral with an unmetered power provision unit energized by a 120-Volt installed via surface mount, pedestal, or a structure, utilized during the permanent electric service phase of an unoccupied dwelling.

In one embodiment, the site management system comprises hardware for effectuating communication services, including, but not limited to wireless internet, cellular, cable, phone, satellite, or any other form of communication now known or future-developed. The provision of these communication services enables voice, data, and video to and from the fielded site, which can be used in numerous end-user applications on a variety of devices.

In this regard, the site management system comprises a wireless network integral with the controller unit, the temporary metered power provision unit, the distributive load center, and the receptacles, i.e., compartmentalized in the same housing. The wireless network is configured to communicatively couple to a plurality of on-site remote devices used by contractors working on the fielded construction site when the plurality of on-site remote devices is within communication range of the wireless network to include, computers, laptops, handheld devices (cell phones), and tablets, autonomous drones, robotics and the like. Such off-site computing devices to which the site management system may communicate include, computers, laptops, handheld devices (cell phones), tablets, autonomous drones, robotics and the like.

That is, when a worker enters into the range of the wireless transceiver contained in the site management system, the wireless transceiver couples to the on-site remote device. This connection allows data to be transferred between the site management system and the on-site remote device.

In one embodiment, upon detection by the wireless transceiver, the wireless transceiver requests a unique identifier from the worker. In this regard, the site management system may determine the type of worker that has entered the field, e.g., a construction worker, an inspector, the type of inspector, a vendor delivering goods, etc. Based upon identification of the worker, the wireless transceiver selectively sends information to the worker. For example, if it is construction worker, the wireless transceiver may send data indicative of tasks to be performed. If it is a vendor delivering goods, the wireless transceiver my transmit data querying the vendor what type of goods are being delivered and the quantity of goods being delivered.

Furthermore, based upon the type of worker entering the range of the Wi-fi, the site management system may deliver construction data including, but not limited to project management data, build plans, bids, change orders, schedules, estimates, material deliveries and/or back orders, budgets, purchase orders, material pricing, invoicing, payables, inspection data including pass/fail data, write-up details and stop work orders, security data including remote site viewing data, access authorization and/or verification, and theft deterrence, and/or marketing data including plans, finishes, and sales pricing Note that the site management system described allows for the provision of temporary power at the fielded site and communication services within the same enclosure. An exemplary enclosure is further described with reference to FIG. 3. Therefore, in one embodiment, the site management system for security and bilateral transfer of information to and from the fielded site. Thus, the site management system facilitates real time informational and security exchange between the fielded site and virtually any place in the world.

FIG. 1A is a block diagram of an exemplary site management system 100 in accordance with an embodiment of the present disclosure. The site management system 100 comprises a site management device 114 and an off-site computing device 112, which is operated by a site manager 104, which can be, for example, a fielded site manager or a general contractor. The site management device 114 and the off-site computing device 112 communicate bilaterally over a network 111. The network 111 may be any type of network known in the art or future-developed. In one embodiment, the network 111 is the Internet, and the site manager 104 may communicate with the site management device 114 via a web browser (not shown) operating on the computing device 112.

The site management system 100 further comprises a wireless network 110 that communicatively couples the site management device 114 to a plurality of end user wireless remote devices 105-108 that are operated by a plurality of end users 101-104, respectively. The end users 101-104 include, but are not limited to a contractor 101, an inspector 102, a vendor 103, and a site manager 104. The wireless network 110 may include, for example, remote signal boosters and repeaters in order to cover the entire fielded site area.

The site management system 100 determines the type of worker that has entered the site in view of the Wi-fi. Based upon the type of worker, the site management device determines the type of data that is sent to the worker, including but not limited to construction data including, but not limited to project management data, build plans, bids, change orders, schedules, estimates, material deliveries and/or back orders, budgets, purchase orders, material pricing, invoicing, payables, inspection data including pass/fail data, write-up details and stop work orders, security data including remote site viewing data, access authorization and/or verification, and theft deterrence, and/or marketing data including plans, finishes, and sales pricing In one embodiment, upon detection by the site management device 114, the site management device 114 requests a unique identifier from the worker. In this regard, the site management system 114 may determine the type of worker that has entered the field, e.g., a construction worker, an inspector, the type of inspector, a vendor delivering goods, etc. Based upon identification of the worker, the wireless transceiver selectively sends information to the worker. For example, if it is construction worker, the site management device 114 may send data indicative of tasks to be performed over the wireless network 110. If it is a vendor delivering goods, the site management device 114 may transmit data querying the vendor what type of goods are being delivered and the quantity of goods being delivered via the wireless network 110.

Note that the end users' wireless remote devices 105-108 may be any type of computing device known in the art or future-developed. For example, the handheld computing devices 105-108 may be a cellular phone, a tablet, a laptop or the like.

In one embodiment, the end user 101 is a contractor, which is an individual that is contracted to perform services on the fielded site. He may be, for example, a concrete contractor that has been hired to pour the foundation, a framer hired to build the frame of the enclosure, a brick layer hired to install brick on the enclosure, etc. Thus, information relating to the contractor's personnel numbers and arrival and departure data may be useful to the site manager 104. This data may be helpful to the site manager 104 in determining the contractor's compensation and monitoring the contractor's performance.

The contractor 101 may have a wireless remote device 105 that is configured to communicate with a controller unit 115 of the site management device 114. In this regard, the wireless remote device 105 may execute an application that transmits data indicative of the date worked, arrival time, departure time, and a unique identifier to the controller unit 115. This worker data may be used to calculate the performance of the contractor, for example. The performance calculation of the work may be performed by the controller unit 115 or the off-site computing device 112. In this regard, the worker data is indicative of the date worked, arrival time, departure time, and the unique identifier and may be transmitted to the off-site computing device 112 either periodically or upon demand by the off-site computing device 112.

In one embodiment, the worker data comprises data indicative of a message. In this regard, the contractor 101 may desire to let the site manager 104 know that he/she needs a particular day off or that a particular job related to the enclosure is running off schedule. The data indicative of the message is sent to the site management device 114, and the controller unit 115 transmits the worker data to the off-site computing device 112 and/or the wireless remote device 108 to communicate this information to the site manager.

In another embodiment, the contractor 101 may have on his person a radio frequency identification chip (RFID) 109. In the embodiment shown, the contractor is wearing the RFID chip 109 around his neck, on his belt clip, or on any other type of attachment. However, this is for exemplary purposes only. For example, the RFID chip 109 may be on a card that is the contractor's pocket. The RFID chip 109 may be on the person of the contractor in any number of ways known in the art or future-developed.

In one embodiment, the end user 102 is a building inspector. In this regard, inspectors may come to the fielded site to ensure that work has been done properly for the enclosure. For example, the inspector may come to the fielded site and inspect plumbing conduit to the enclosure or in the enclosure, electrical wiring in the enclosure, the foundation, the framing, the brick, the wallboard, or the like.

The inspector 102 has a wireless remote device 106. The wireless remote device 106 executes an application (not shown) that displays inspection forms to a display device (not shown) on the wireless remote device 106. With an input device (now shown), e.g., a stylus, the inspector enters data relating to the inspection of the particular characteristic of the enclosure. In this embodiment, the application transmits inspection data, in real-time, upon request, upon completion, or periodically, to the site management device 114. This inspection data may comprise data indicative of pass/failure of the inspection. In such an embodiment, the controller unit 115 may transmit in real-time data indicative of the pass or failure to the off-site computing device 112 or to a wireless remote device 108 of the site manager 104 that indicates pass or failure of a particular inspection.

In one embodiment, the inspection data comprises data indicative of a message. In this regard, the site management device 114 allows the site manager 104 to know that the inspector 102 is at the site for a particular inspection. Also, the site management device 114 may alert the site manager 104 that a particular inspection is completed. The data indicative of the message is sent to the site management device 114 by the inspector 102, and the controller unit 115 transmits the inspection data to the off-site computing device 112 and/or the wireless remote device 108 to communicate this information to the site manager.

In one embodiment, the end user 103 is a vendor. In this regard, vendors may come to the fielded site to perform a material takeoff or delivery of goods for building the enclosure on the fielded site. For example, the vendor 103 may come to the fielded site to measure the enclosure for bricks for bricking the enclosure, or the vendor 103 may come to the fielded site to deliver the bricks that were previously ordered.

The vendor 103 has a wireless remote device 107. The wireless remote device 107 executes an application (not shown) that transmits and receives data for a particular order or outputs data for fulfillment of a particular order. With an input device (now shown), e.g., a stylus, the vendor enters data relating to the purchase or fulfillment of the goods. In this embodiment, the application transmits vendor data, in real-time, upon request, upon completion, or periodically, to the site management device 114. This vendor data may comprise data indicative of cost of goods ordered, amount of goods delivered, or other data related to the purchase/order of the goods or fulfillment of the order. In such an embodiment, the controller unit 115 may transmit in real-time data indicative of the cost of the goods or the amount of goods delivered to the off-site computing device 112 or to a wireless remote device 108 of the site manager 104, and the off-site computing device 112 or the wireless remote device 108 may notify the site manager 104, in real-time or upon activation of an application of the vendor data transmitted.

In one embodiment, the vendor data comprises data indicative of a message. In this regard, the vendor 103 may desire to let the site manager 104 know that he/she is at the site for the delivery of goods. The data indicative of the message is sent to the site management device 114, and the controller unit 115 transmits the inspection data to the off-site computing device 112 and/or the wireless remote device 108 to communicate this information to the site manager 104.

As described hereinabove, the site manager 104 may interface with the site management device 114 via the off-site computing device 112 or the wireless remote device 108. In this regard, the controller unit 115 transmits worker data, vendor data, and inspection data to the off-site computing device 112 via the network 111.

Upon receipt by the off-site computing device 112, the off-site computing device 112 may perform a number of operations on or related to the worker data, vendor data, and inspection data (collectively referred to as manager data) received. In this regard, the off-site computing device 112 may translate the manager data into data indicative of real-time notifications. For example, if the inspection fails, the off-site computing device 112 may immediately post data to a display device and make a particular sound that indicates that an inspection failed. In another embodiment, the off-site computing device 112 may determine that a message comprises key words or data such that the message received should be immediately provided to the site manager 104. In such a scenario, the off-site computing device 112 might prepare a message and send the message, e.g., in the form of a text message, to the wireless remote device 108 of the site manager 104.

Upon receipt by the wireless remote device 108, the handheld 108 may perform a number of operations on or related to the site manager data received. In this regard, the wireless remote device 108 may translate the manager data into data indicative of real-time notifications. For example, if the inspection fails, the wireless remote device 108 may immediately post data to a display device and make a particular sound that indicates that an inspection failed. In another embodiment, the handheld computing device 108 may determine that a message comprises key words or data such that the message received should be immediately provided to the site manager 104. In such a scenario, the wireless remote device 108 might prepare a message and display the prepared message to the wireless remote device 108 of the site manager 104.

The site management device 114 further comprises a power provision unit 116. The power provision unit 116 receives voltage from an input voltage cable (not shown), distributes the voltage, and outputs power to the controller unit 115, and a number of electrical receptacles. Thus, the site management device 114 comprises not only the management services described hereinabove, but also integral with the controller unit 115, the site management device 114 comprises the power provision unit 116.

Figure 1B:
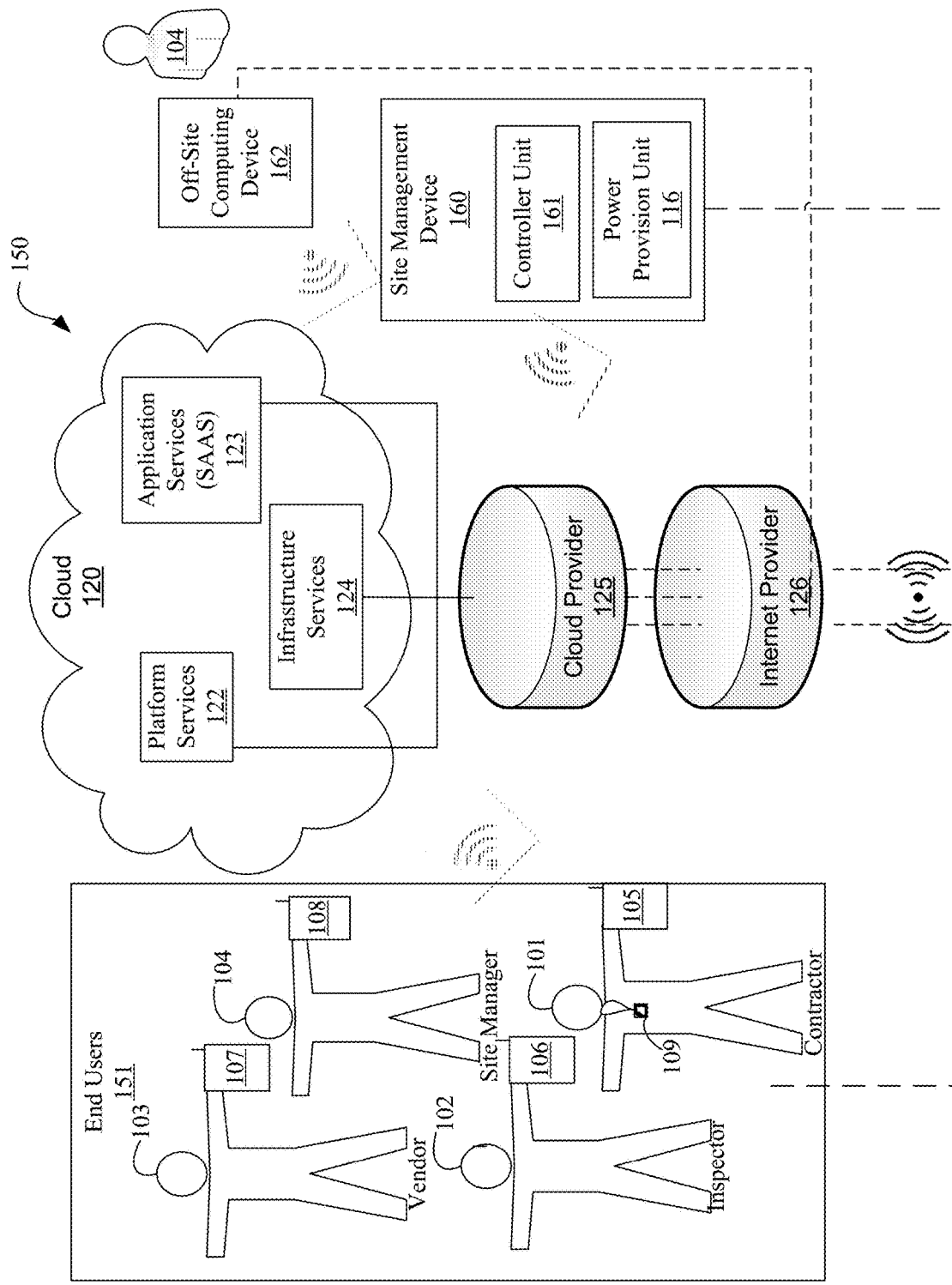
FIG. 1B is a block diagram of another exemplary site management system in accordance with another embodiment of the present disclosure.

FIG. 1B is block diagram depicting another site management system 150 in accordance with an embodiment of the present disclosure. The site management system 150 comprises similar component to the site management system 100 depicted in FIG. 1A. The difference between the site management system 100 in FIG. 1A and the site management system 150 in FIG. 1B is the system of FIG. 1B is built on a cloud computing architecture. Note that the functionality of the components as described hereinabove with reference to FIG. 1B are applicable as well to the same common components in FIG. 1B.

In this regard, the site management system 150 of FIG. 1B comprises a group of end users 151 including a contractor 101, an inspector 102, a vendor 103, and a site manager 104. Note that the site manager 104 included in the group is optional and the site manager 104 may also be part of the site management system 150 through use of an off-site computing device 162.

As noted hereinabove, the difference between the site management system in FIG. 1A and the site management system in FIG. 1B is the difference in the system architecture. In this regard, the site management system 150 is cloud based computing. That is, data and software for the operation of the site management system 150 is stored and accessed through the cloud 120 over the Internet via the cloud provider 125 that is coupled to the Internet 126. The data and software are accessible by the wireless remote devices 105-108, the site management device 160, and the off-site computing device 162.

Note that there is a difference between the off-site computing device 112 (FIG. 1A) and the off-site computing device 162 (FIG. 1B). That is, the off-site computing device 162 does not store and access data and programs locally. Instead, the off-site computing device 162 accesses data and programs stored on the cloud 120 over the Internet. Also, the difference between the site management device 114 and the site management device 160 is the controller unit 161 accesses data and programs over the Internet that are stored in the cloud 120.

The cloud 120 comprises application services 123 (also known as software as a service (SaaS)). As FIG. 1A is described further herein, those services and data associated with the application services 123 will be identified throughout. In this regard, applications and services of the controller unit 161 may be stored and accessed through the Internet provider 126 and the cloud provider 125, as well as application services provided to the wireless remote devices 105-108. Additionally, any software executed by the off-site computing device 162 and data used by the off-site computing device 162 may also be stored as application services 123 in the cloud 120. In one embodiment, the wireless remote devices 105-108, the site management device 160, and the off-site computing device 162 accesses the applications services 123 via a web browser (not shown).

Further, the cloud 120 comprises platform services 122 (also known as platform as a service (PAAS)). The platform services 122 provide a framework to information technology (IT) directors for maintaining the application services 122.

In this regard, the platform services 122 provide a platform allowing the site manager 104 to develop run and manage applications provided in the applications services 123.

Additionally, the cloud 120 comprises infrastructure services 124 (also known as Infrastructure as a Service (IaaS)). The infrastructure services 124 provide virtualized computing resources to the off-site computing device 162 so that the site manager 104 can handle a variety of tasks, including system maintenance and backup. The infrastructure services 124 also provide the site manager 104 with the capability to automate administrative tasks, dynamic scaling, desktop virtualization and policy-based services.

Notably, during operation, the applications that the end-users use are executed from the application services 123. However, the operation of the application services 123 are the same as those described with reference to the wireless remote devices' functionality, the site management device's functionality and the off-site computing device's functionality as described hereinabove and further herein.

Figure 2:
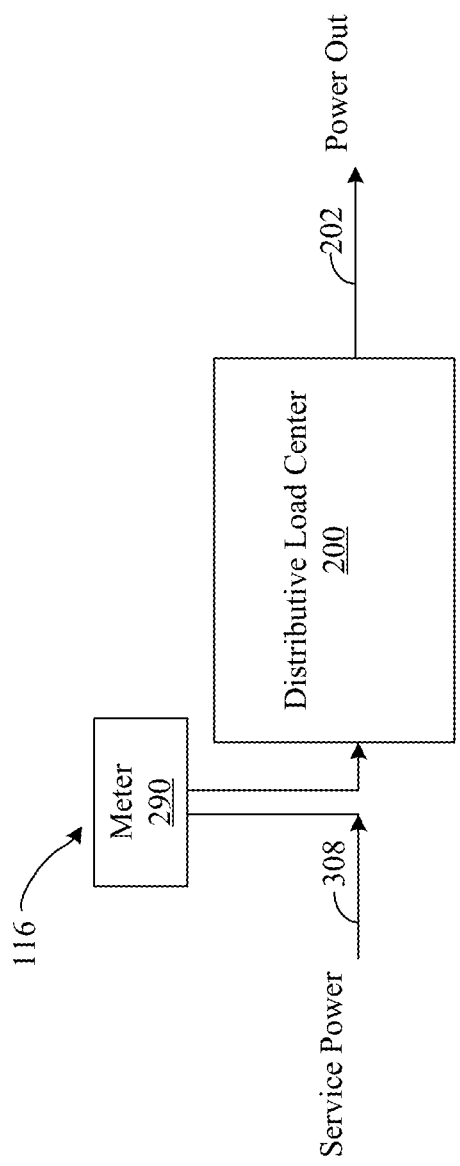
FIG. 2 is a block diagram of an exemplary power provision unit as depicted in FIGS. 1A and 1B in accordance with an embodiment of the present disclosure.

FIG. 2 is a block diagram depicting an exemplary power provision unit 116 of the present disclosure. The power provision unit 116 receives service power from a power line via an input cable 308. The power received is metered by the meter 290. The power is received through a distributive load center 200 to a plurality of circuits (shown in FIG. 3) and the controller unit 161 (shown in FIG. 1B).

Figure 3:
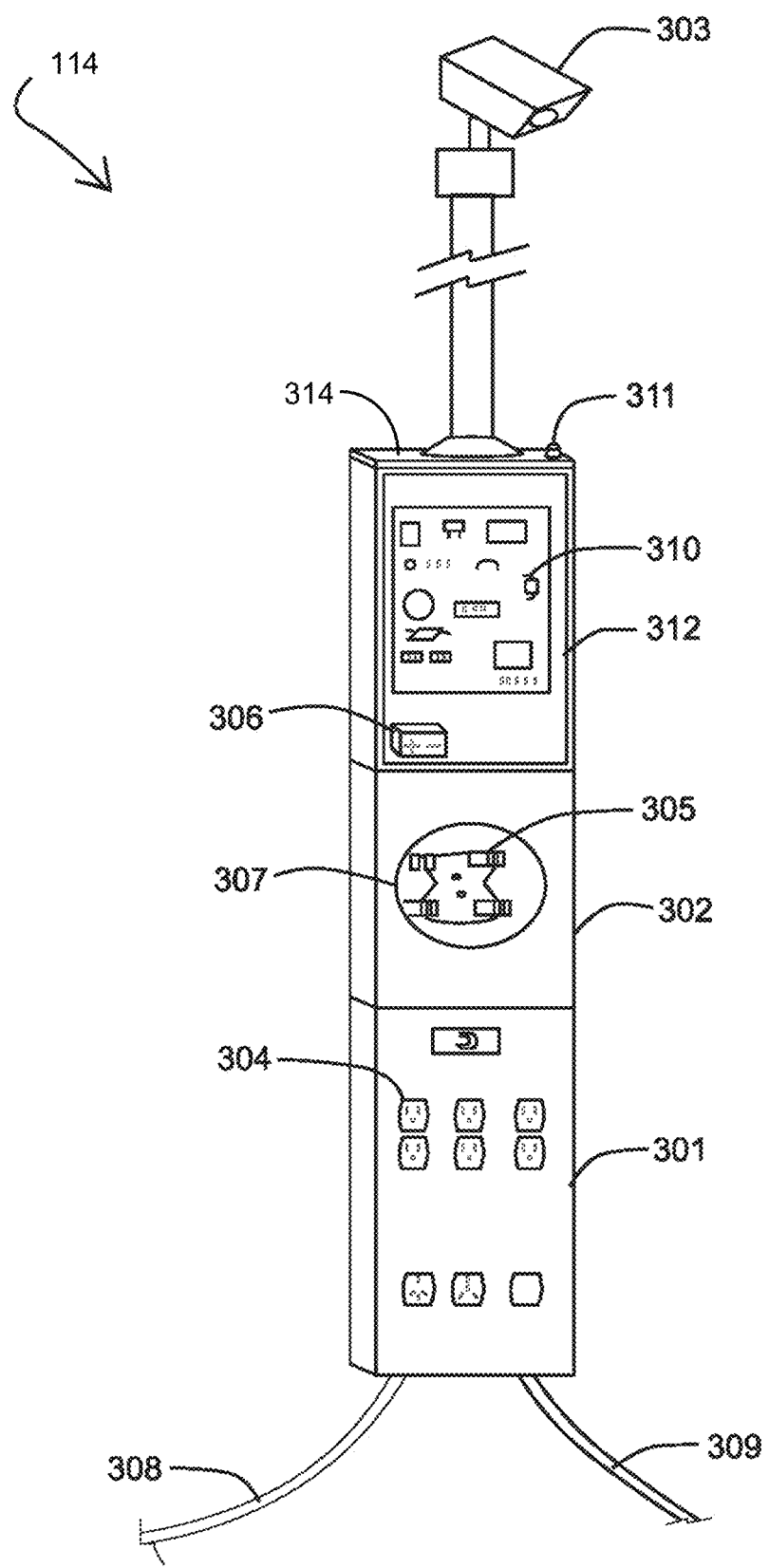
FIG. 3 is an exemplary site management device as depicted in FIGS. 1A and 1B in accordance with an embodiment of the present disclosure.

FIG. 3 is an exemplary site management device 114 in accordance with an embodiment of the present disclosure. The site management device 114 comprises a housing 314. In this particular embodiment, the housing is a cuboid. However, the housing 314 may be other shapes in other embodiments. For example, the housing 314 may be a cube in another embodiment.

The housing 314 comprises three separate and distinct sub-housings, including a control unit housing 312, an electric meter housing 302, and an electrical service housing 301. In the embodiment depicted, each housing 312, 302 and 301 of the housing 313 are stacked one on top of the other; however, the housings 312, 302 and 301 may be arranged differently in other embodiments of the present disclosure.

The electrical service of housing 301 and housing 302 (shown in FIG. 3) comprises the power provision unit 116 (FIG. 1A and FIG. 2). As described hereinabove, the meter 290 receives service power, which is measured and provided to the distributive load center and provided to receptacles 304 and the controller unit 115 (FIG. 1A). In this regard, the site management device 114 comprises the cable 308 that provides service power to meter 290 (FIG. 2) and the controller unit 115.

The distributive load center 200 provides power as output to the one or more receptacles 304. Note that in one embodiment, the services housing unit 301 may comprise a disconnect, which may or may not be housed in a separate compartment from the receptacles 304 for providing electricity to the fielded site.

The electric meter housing 302, which may be situated atop the distributive load center, comprises meter housing receptacles 305. The meter housing receptacles 305 have a supply side and a load side for the purpose of energizing the site management device 114 and measuring the power consumed. The meter housing receptacles 305 are not limited by ampere or phase restrictions, but are determined by electrical requirements based on specific applications and local electrical codes.

The control unit housing 312 comprises a control unit circuit board 310 that interfaces with the controller unit 115 (FIG. 1A). The circuit board 310 comprises input/output devices, may include one or more, a cellular transceiver, a satellite transceiver, cable service provided card, a phone modem, a wireless transceiver, a voice over internet protocol (VOIP) device, Skype, a video device, flash memory. Each of these is described further with reference to FIG. 4.

Additionally, the site management device 114 comprises a main camera unit 303 mounted to the top of the housing 314. The main camera unit 303 may have pan, tilt and zoom capabilities. Additionally, the main camera unit 303 may be high-definition (HD) and web-enabled. Further, the main camera unit 303 may have auto-tracking and night vision. In one embodiment, the controller unit 115 (FIG. 1A) may be coupled to the main camera unit 303 and a plurality of remote cameras (not shown). In this regard, the controller unit 115 may collect timestamped video from the main camera unit 303 and the remote cameras and provide the site manager 104 and off-site computing device 112 access to a full picture of the fielded site at one time.

The main camera unit 303 may collect video from the fielded site, and store the video locally. This video may be transmitted by the controller unit 114 to the off-site computing device 112 in real-time, periodically, or upon demand. Further, the video may be transmitted to the wireless remote device 109 of the site manager. In this regard, the site manager 104 is able to visually monitor the fielded site. As an example, if a vendor 103 (FIG. 1A) delivers bricks to the fielded site, the site manager 104 may receive a message indicating that a delivery is being made, and the site manager 104 may open up an application on his handheld 109 or on the off-site computing device 112 so that he can visually inspect the delivery. Additionally, the control unit 115 may send video during off-hours so that the site manager 104 can surveil the fielded site off-hours if he/she is having a problem with theft or unauthorized accesses.

Note that the main camera unit 303 is integral with the wireless network, the controller unit, the temporary metered power provision unit, the distributive load center, and the receptacles, i.e., in the same housing. The camera is configured to monitor the fielded construction site and record data indicative of photographs of the first fielded construction site. Further note that the main camera unit 303 is communicatively coupled to the plurality of remote devices for use by the contractors for remote viewing of the fielded construction site. Remote viewing may be performed while the contractor is on-site or remote viewing may be performed while the contractor is not at the fielded site, e.g., the contractor is at home. In this regard, the main camera unit 303 may transmit data indicative of photographs of the fielded site to the contractor's computing device (at home), his handheld (cell phone), or tablet.

Additionally, the site management device 114 comprises a communication service entrance cable 309 (FIG. 3) provided by local communication service providers. These communication solutions may or may not be internet, cable service provider or phone service provider, may use fiber optic cable (FOC), coaxial or twisted-pair cables, or any solutions known in the art or future-developed, if available and/or required.

Figure 4:
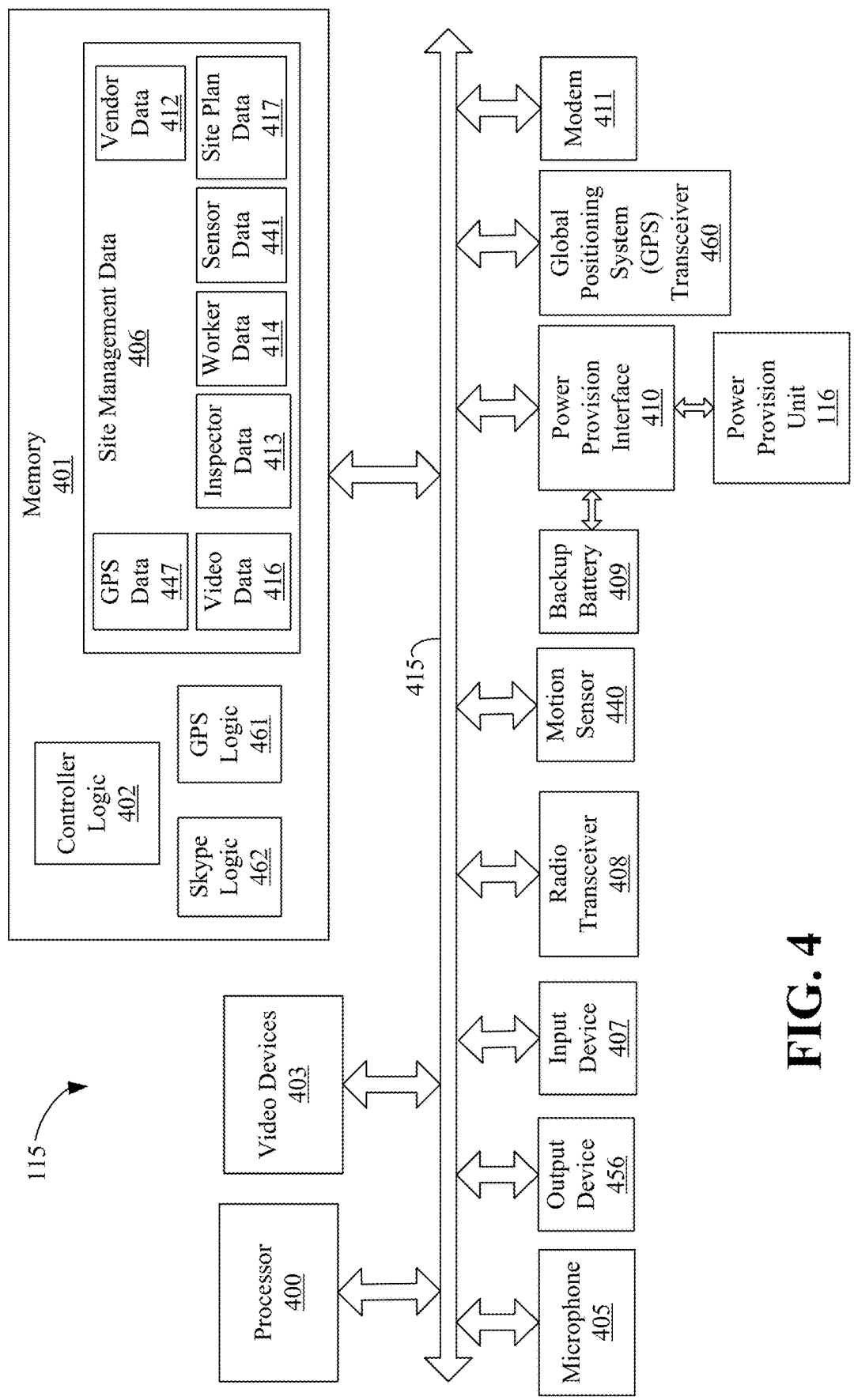
FIG. 4 is a block diagram of an exemplary controller unit such as is depicted in FIGS. 1A and 1B in accordance with an embodiment of the present disclosure.

FIG. 4 is a block diagram of an exemplary controller unit 115 as depicted in FIG. 1A. The exemplary controller unit 115 may comprise a processor 400, a video device 403, a microphone 405, an output device 456, an input device 407, a radio transceiver 408, a backup battery 409, a power provision interface 410, a modem 411, and memory 401. Additionally, the exemplary controller unit 115 may comprise a global positioning system (GPS) transceiver 460.

Each of these components communicates over local interface 415, which can include one or more buses.

The controller unit 115 further comprises control logic 402, Skype® logic 462, and global positioning system (GPS) logic 461. Note that the control logic 402, the Skype logic 462, and the GPS logic 461 can be software, hardware, or a combination thereof. In the exemplary site management device 114 shown in FIG. 4, control logic 402 is software stored in memory 401. Memory 401 may be of any type of memory known in the art, including, but not limited to random access memory (RAM), read-only memory (ROM), flash memory (for the purpose of mass storage), or the like.

The controller logic 402, the Skype logic 462, and the GPS logic 461 are shown in FIG. 4 as stored in memory 401. When stored in memory 401, control logic 402, the Skype logic 462, and the GPS logic 461 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

In the context of the present disclosure, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

Processor 400 may be a digital processor or other type of circuitry configured to run the control logic 402 by processing and executing the instructions of the control logic 402. Further, the processor 400 communicates with and drives the other elements within the site management device 114 via the local interface 406.

The controller unit 115 further comprises a radio transceiver 408. The radio transceiver 408 transmits and receives radio waves. The radio transceiver 408 is used to transmit and receive radio waves by the controller logic 401. In this regard, the radio transceiver 408 may be a wireless fidelity (Wi-Fi) transceiver that transmits/receives data to/from the wireless remote devices 105-108 (FIG. 1A) over the wireless network 110 (FIG. 1A). Additionally, the radio transceiver may be used for satellite communications in other embodiments. The transceiver 408 may be, for example, a low-powered radio device, e.g., a radio semiconductor, radio frequency antenna (RF antenna) or other type of communication device, which communicatively couples the site management device 114 (FIG. 1A) with the wireless remote devices 105-108.

The microphone 405 is any type of device that is capable of capturing analog signals, e.g., a person's voice. In this regard, the analog signal is received and the controller logic 402 translates the analog signal into digital data indicative of the user's voice. After translation, the digital data indicative of the person's voice may be transmitted like any other type of data, e.g., email, over the Internet via the network 111 and/or any type of network, e.g., over the wireless network 110. Further, the controller logic 402 may transmit the data to an end user, e.g., the wireless remote devices or the off-site computing device 112, on a landline or cell phone.

In one embodiment, the controller logic 402 is configured to translate the digital data into a text or email message that may be readable by the end user. In this regard, a worker or contractor in the fielded site may speak into the microphone 405 indicating a pre-determined identification that is associated in worker data 414 with the worker. In one embodiment, the controller logic 402 may store data indicating that the worker has entered the fielded site, transmit notification to the site manager's remote device 108 (FIG. 1A), and/or transmit notification to the off-site computing device 112 (FIG. 1A).

The output device 456 is any type of output device known in the art or future-developed. For example, the output device 456 may include a display device or a speaker device.

The input device 407 is any type of input device known in the art or future-developed. For example, the input device 407 may include a keyboard, a mouse, touchscreen, or the like. It is any type of device that allows a user 105-108 to input data into the site management device 114.

In one embodiment, the controller unit 115 further comprises a battery backup. In this regard, during operation power may be supplied to the controller unit 115 via a power provision interface to the power provision unit. If in the event that power is cut off from the power provision unit 116, the power provision interface can access power stored in the backup battery so that the controller unit 115 can continue to operate.

In one embodiment, the controller unit 115 comprises a modem 411. The modem 411 may be coupled to a phone (not shown). The modem 411 allows landline and/or cellular calls to be made from the site management device 114.

In one embodiment, the controller unit 115 comprises at least a motion sensor 440. Note that other sensors may be used by the controller unit 115.

The motion sensor 115 may be any type of sensor to detect a particular signal. For example, the motion sensor may be configured to detect sound, infrared, pressure, or vibration. In such an embodiment, if there is detection by the motion sensor 440, the controller logic 402 stores the data indicative of the signal in motion sensor data 441. The control logic 402 may also communicate information to the site manager 108 (FIG. 1A) either via the wireless remote device 104 (FIG. 1A) or the off-site computing device 112 (FIG. 1A) that the sensor 440 has detected sound, movement, vibration, pressure, or the like. In one embodiment, the motion sensor 440 detects motion on the property (which is also recorded by a camera), and in response polls for a device on the fielded site. If no data is transmitted back to the controller unit 115, then the motion is unknown. In such a case, the controller logic (FIG. 4) may transmit a message to the site manager 104 that there are undesirable activities on the fielded site.

In one embodiment, the controller unit 115 comprises one or more video devices 403. In the example provided in FIG. 3, one video device is the main camera unit 303 (FIG. 3). The video device 403 captures video data indicative of the fielded site. The controller logic 402 stores the captured data as video data 416.

Further note that in one embodiment the video devices 403 may further comprise a plurality of remote cameras (not shown) that wireless communicate with the controller unit 115 and transmit data of a particular field of view of the fielded site depending upon where the remote video devices 403 are located and situated. In such an example, the video data 416 includes data indicative of each view of the fielded site associated with the particular camera collecting the data.

Note that in one embodiment, the controller unit comprises the Skype® logic 462. In such an embodiment, the wireless remote devices 104-108, through the wireless network 110 may enable the contractor 101, the inspector 102, the Vendor 103, and the site manager 104 to communicate via the Skype® logic 462. In this regard, one of the users 101-104 may have a conversation using the Skype® logic with any one of the other users 101-105 or with any other party.

Additionally, the controller unit 115 may comprise the GPS transceiver 460 and the GPS logic 461. In such an embodiment, the GPS logic 461 may provide location information of the site management device 114, and GPS data of remote devices 105-108 (FIG. 1A). In one example, the site manager 104 may manage multiple fielded sites, and the GPS logic may provide the site manager 104 with information specific to the plurality of site management devices 114 based upon GPS data 447.

Vendor data 412 is any type of data indicative of goods and services provided by a vendor 103 (FIG. 1A). This may include a purchase order captured on the off-site computing device 112 (FIG. 1A) and transmitted to the site management device 114. Additionally, the vendor data 412 may include data indicative of an invoice that is transmitted by the vendor's handheld 107 to the site management device 114. The vendor data 412 may further include data indicative of an invoice, delivery times, costs, exceptions, or the like.

In one embodiment, the vendor 103 drops a ticket upon delivery of goods to the fielded site. In such an embodiment, the wireless remote device 107 is configured for transmitting data indicative of a drop ticket. The remote device 107 may transfer the data indicative of the drop ticket to the site management device 114. In response, the site management device 114 may send the data indicative of the drop ticket to the site manager's wireless remote device 108 or off-site computing device 112. In another embodiment, the controller logic 402 (FIG. 4) may analyze the data indicative of the drop ticket and transmit messages to the site manager regarding particular characteristics about the drop ticket.

Inspector data 413 is any data related to the inspection of the fielded site and the inspector 102 (FIG. 1A). For example, the inspector data may comprise data indicative of an inspection time and inspection component. For example, the inspection data 413 may comprise data indicative of Thursday morning, 10 AM, and foundation, which means that on Thursday morning at 10 AM, the inspector will be inspecting the foundation of the structure under construction. In addition, the inspection data 413 comprises inspection results and/or pass and fail data, or the like.

Worker data 414 is any type of data indicative of a particular laborer or group of laborers. For example, in one embodiment, the radio transceiver 408 receives worker data indicative of a particular laborer or group of laborers on the fielded site from the laborers' RFID chips 109 (FIG. 1A) or wireless remote devices 105-108. The worker data may include time stamps indicating when the laborer enters onto and exits from the fielded site. Additionally, the worker data 414 may comprise data indicative of a message for the site manager 104.

Site plan data 417 is any data indicative of the construction plan for the fielded site. In this regard, the site plan data 417 may comprise construction drawings or component characteristics of the features of the structure being constructed. In such an embodiment, the site manager 104 may use the off-site computing device 112 to transmit site plan data 417 to the site management device 114. Additionally, the site manager 104 can also transmit site plan data changes to the site management device, which are stored as site plan data 417. Note that access may be provided to third parties' storage data, e.g., a drop box, via the network 111.

Figure 5:
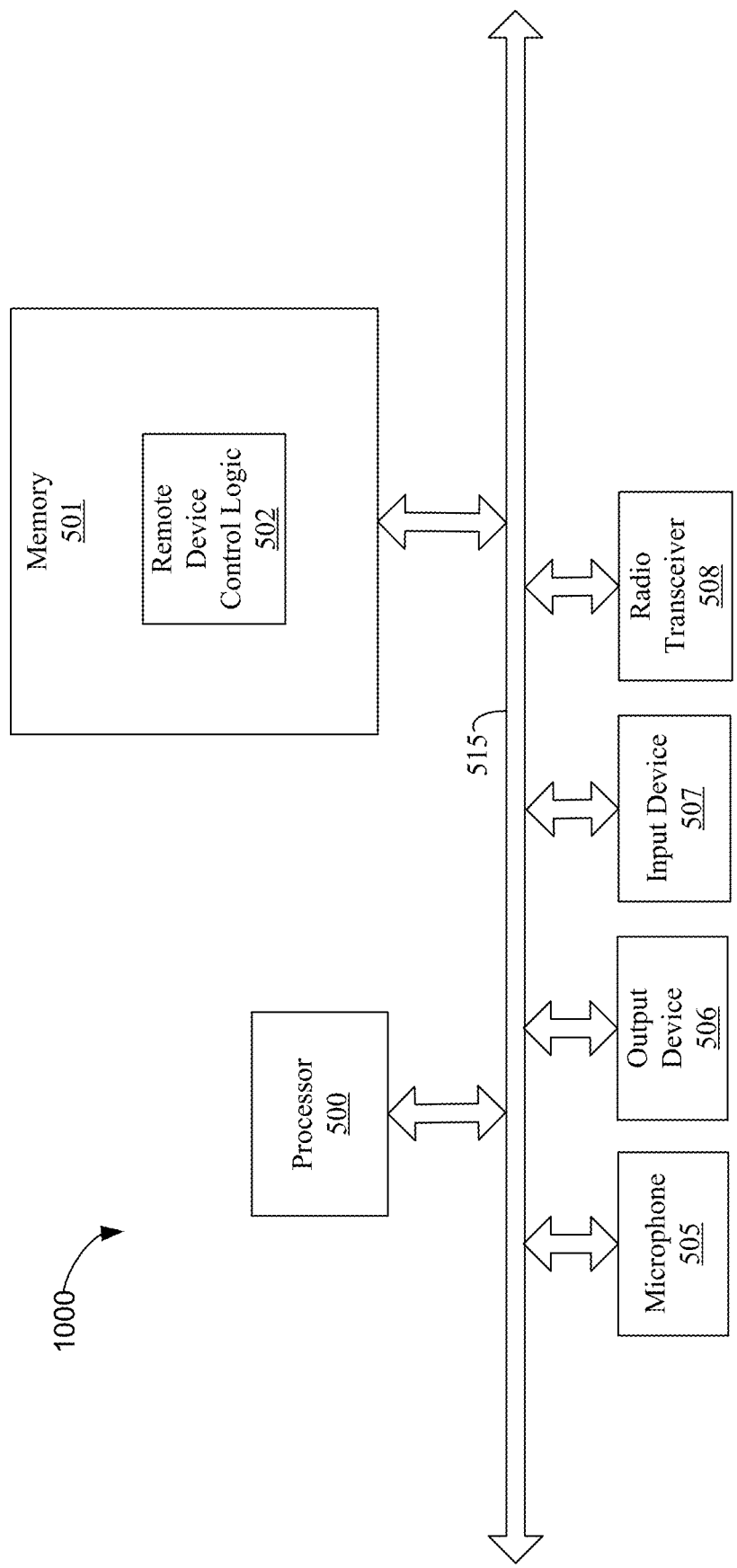
FIG. 5 is a block diagram of an exemplary remote device as depicted in FIG. 1A and FIG. 1B in accordance with an embodiment of the present disclosure.

FIG. 5 is a block diagram depicting an exemplary remote device, e.g., wireless remote devices 105-108. In particular, FIG. 5 depicts any type of device that could remotely access the site management device 114, thereby having access to the site management data 406 (FIG. 4) and the controller logic 402 (FIG. 4). These devices 105-108 are collectively referred to as remote devices 500 for purposes of simplicity of discussion. The remote device 500 generally comprises a processor 500 and memory 501. Each of these components communicates over local interface 515, which can include one or more buses.

The remote device 500 further comprises remote device control logic 502. Note that the control logic 502 can be software, hardware, or a combination thereof that executes on the remote device 500. In the exemplary remote device 500 shown in FIG. 5, remote device control logic 502 is software stored in memory 501. Memory 501 may be of any type of memory known in the art, including, but not limited to random access memory (RAM), read-only memory (ROM), flash memory (for the purpose of mass storage), or the like.

When stored in memory 501, the remote device control logic 502 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. Further, the memory may be third party storage, e.g., a drop box, or the like.

In the context of the present disclosure, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

Processor 500 may be a digital processor or other type of circuitry configured to run the control logic 502 by processing and executing the instructions of the control logic 502. Further, the processor 500 communicates with and drives the other elements within the remote device 500 via the local interface 515.

The operation and functionality of the remote device 500 is described further herein. Notably, the remote device 500 communicates with the site management device 114 (FIG. 1A) via the radio transceiver 508 over the wireless network 110 to effectuate operations related to site management.

Figure 6:
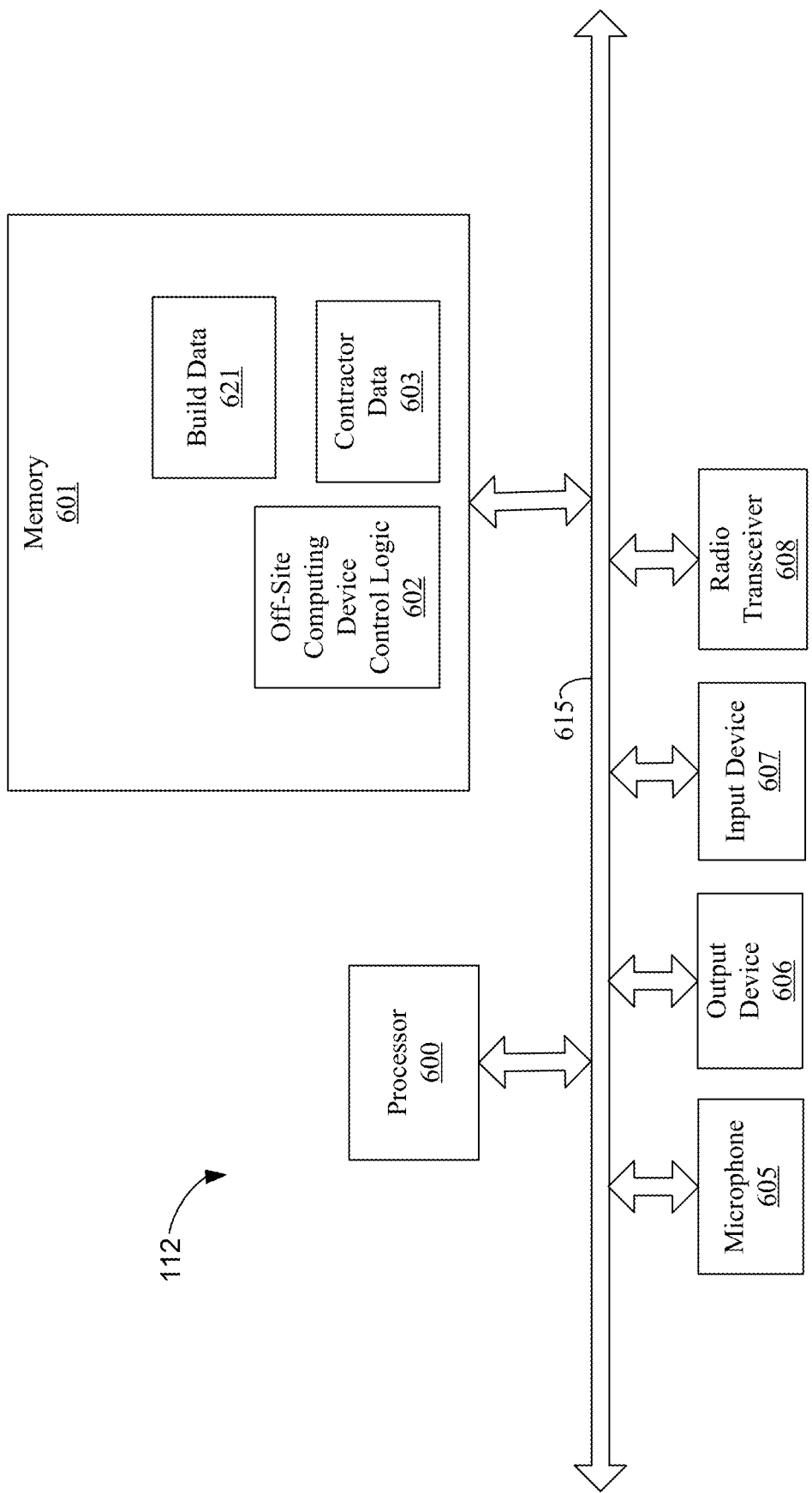
FIG. 6 is a block diagram of an exemplary off-site computing device as depicted in FIG. 1A and FIG. 1B in accordance with an embodiment of the present disclosure.

FIG. 6 is a block diagram of an exemplary off-site computing device 112 (FIG. 1A). In particular, FIG. 6 depicts any type of computing device that could remotely access the site management device 114, thereby having access to the site management data 406 (FIG. 4) and the controller logic 401 (FIG. 4). The off-site management device 112 generally comprises a processor 600 and memory 601. Each of these components communicates over local interface 615, which can include one or more buses.

The off-site computing device 112 further comprises off-site computing device control logic 602. Note that the control logic 602 can be software, hardware, or a combination thereof. In the exemplary off-site computing device control logic shown in FIG. 6, off-site computing device control logic 602 is software stored in memory 601. Memory 601 may be of any type of memory known in the art, including, but not limited to random access memory (RAM), read-only memory (ROM), flash memory (for the purpose of mass storage), or the like.

When stored in memory 601, the off-site device control logic 602 can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

In the context of the present disclosure, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

Processor 600 may be a digital processor or other type of circuitry configured to run the off-site computing device control logic 602 by processing and executing the instructions of the off-site computing device control logic 602. Further, the processor 600 communicates with and drives the other elements within the off-site computing device 112 via the local interface 615.

The build data 621 is all data related to all job sites with which a general contractor is currently working. For example, the build data 621 can comprise the GPS coordinates and/or address for a particular build. Thus, when a contractor is interested in a particular build, he can pull up the particular build's information.

The operation and functionality of the off-site computing device 112 is described further herein. Notably, the off-site computing device 112 communicates with the site management device 114 (FIG. 1A) via the radio transceiver 608 over the network 111 to effectuate operations related to site management.

In operation, the site management system 100 enables the management of end-users 101-104 via data collected from and data transmitted to the wireless remote devices 105-108 (each described collectively in FIG. 5 as remote device 500) and calculations and/or analysis performed on the wireless remote devices 105-108 and/or the site management device 114 (FIG. 1A). Management of the fielded site and the contractors, inspectors, and vendors is further effectuated by data collected from and data transmitted to the off-site computing device 112 (FIG. 1A) and via calculations and/or analysis performed by the off-site computing device 112.

Note that in one embodiment the remote device control logic 502 on the wireless remote devices 105-108 comprises the remote device control logic 502 that sets the end user up to use the system 100 (FIG. 1A). That is when the remote device control logic 502 is installed on the wireless remote devices 105-108, the user enters identifying information, e.g., his job type, his name, his company name, his address, his bank information for direct deposit for contractors), a phone number, or other identifying information, or the like. When the site management device 114 receives this identifying data, the controller logic 402 generates a random unique identifier by using the identifying information that is provided by the end user 101-104. In such a scenario, the remote device control logic 502 has been previously downloaded to and installed on the wireless remote device 105-108 (FIG. 1A). In one embodiment, the remote device logic 502 may be an app (application) that runs on the remote devices 105-108.

In one embodiment, the wireless remote devices 105-108 (FIG. 1A) are configured to periodically transmit their unique identifiers to the site management device 114 (FIG. 1A) while the corresponding end user 101-104 is on the fielded site. In another embodiment, the site management device 114 is configured to periodically request the unique identifier from the wireless remote devices 105-108. This handshaking operation between the site management device 114 and the wireless remote devices 105-108 allows the site management device 114 at any given time to know exactly who is on the fielded site. Thus, the site manager 104, via his wireless remote device 108 or via the off-site computing device 112 may query the site management device and request a list of those individuals currently on the fielded site.

In one embodiment, the RFID chip 109 continuously transmits a unique identifier. When the contractor wearing the RFID chip 109 enters the wireless network area of wireless network 110, the controller logic 402 (FIG. 4) detects the unique identifier, queries the controller unit 115 for a timestamp and stores the unique identifier and the timestamp in worker data 414.

Periodically or upon request by the site manager 104 via the off-site computing device 112, the worker data 414 is transmitted to the off-site computing device 112. The off-site computing device 112 collects the worker data per end-user. The off-site computing device control logic 602 then calculates the amount of compensation for the contractor 101 (FIG. 1A). In one embodiment, the off-site computing device 112 transmits data indicative of a direct deposit to the contactor's bank via the radio transceiver 608. In another embodiment, where the off-site computing device 112 comprises a printer (not shown), the site manager 104 may print a check for the worker based upon the compensation calculated from the worker data.

Note that the off-site computing device 112 stores contractor data 603, which comprises data indicative of contractor names, other identifying information, and the contractor's unique identifier. Thus, in calculating and effectuating payment or determining performance based upon progress of the contractor, the off-site computing device control logic 602 searches the contractor data 603 for the unique identifier to determine to which contractor payment is to be made. Additionally, the off-site computing device control logic 602 compares the historical data related to when the contractor has worked, compares this to the contractor's work characteristics, i.e., previous jobs, performance, reliability, etc. If the contractor 102 is not working the timeline to which the contractor 104 previously agreed, the off-site computing device control logic 602 may compose a message, for example requesting a meeting related to performance and reliability, and transmit data indicative of the message to the site management device 114, and the controller logic 402 transmits the data indicative of the message to the contractors remote device 105, site managers remote device 108 and off-site computing devices 112.

Note that the site management system allows for bilateral communication between the site management device 114 and the wireless remote device 105. In this regard, the remote device control logic 502 (FIG. 5) comprises the input device 507, and a graphical user interface (GUI) (not shown) displayed to the output device 506 may enable the remote device control logic 502 to transmit data indicative of a message via the wireless network 111 to the site management device 114. The controller logic 402 may analyze the message for keywords to determine if the message indicates a situation that needs immediate attention, and if it is such a situation, the controller logic 402 may send data indicative of an alert notification to the off-site computing device 112 or to the wireless remote device 108 that alerts the site manager 104 to the need for immediate attention.

As an example, the data indicative of the message may comprise the keywords "vendor" and "not delivered," which may indicate that needed goods were not provided by the vendor for the work planned for the day cannot be performed. In one embodiment, a GUI may provide a list of predetermined messages that a contractor can use to send to the site management device 114. For example, the contractor 101 may select from a list consisting of "not delivered," "inspector didn't show," "inspector showed up," "inclement weather," and the like. The contactor may select one, send it to the site management device 114, and the controller logic 402 compares the data to a list of predetermined messages in order analyze the urgency of the situation.

The site management system 100 may further be used to communicate site plan data in the form of changes to the contractor. In this regard, site plan data 417 (FIG. 4) is stored on the controller unit 115. In one embodiment, the site plan data 417 is displayed upon request to the output device 456 (FIG. 4) of the controller unit 115. In this scenario, the contractor 101 may either view the data indicative of the site plan data 417 at the site management device 114 or over the wireless network 110 via the wireless remote device 105, the remote device control logic 502 displays images on the wireless remote device 104 via the output device 506. Additionally, the site manager 104 (FIG. 1A) may upload a site plan data change. If a change is uploaded to the site management device 114, the controller logic 402 may detect the new changes to the site plan data, either via analysis contained in the new site plan or via a message from the site manager 104 attached to the new site plan data. Upon detection of the new site plan data 417, the controller logic 402 transmits a message to the contractor 101 (or a plurality of contractors on the fielded site) that new site plan data has been delivered. In one embodiment, the contractor 101 may view the new site plan data on the wireless remote device 105, or the contractor 101 may go to the site management device and request via the input device 407 display of the new site plan data 415.

In one embodiment, the contractor 101 may enter a message into the contractor's handheld via the microphone 505. The remote device control logic 502 may translate the analog signal indicate of the message into digital data and transmit the digital data to the site management device 114. The controller logic may analyze, using artificial intelligence or other methods, the digital data received to determine if the message comprises data indicative of an alert scenario. If it does, the controller logic 502 may transmit a notification to the site manager 104 (FIG. 1A) to the off-site computing device 112 or the site manager's wireless remote device 108.

The inspector 102 further operates the wireless remote device 106. As described hereinabove, the inspector 102 may come to the fielded site at which the site management device 114 is installed. The inspector 102 may be there to inspect a certain aspect of the job being performed on the fielded site.

In one embodiment, when the inspector 102 enters the proximity of the wireless network, the remote device control logic 502 transmits a unique identifier to the site management device 114. Upon receipt, the controller logic 402 determines that the unique identifier identifies an inspector 102 by searching in the inspector data 413.

If a guest is not registered in the site management data 406 (FIG. 4), the controller logic 402 transmits data to the wireless remote device 500 requesting the guest register with the system. The remote device logic 502 may then request that the guest register with the system. The controller logic 402 may create a unique identifier for the guest using the registration information, which may include the guests name, company, phone number, address, and other identifying information.

Note that with any of the remote wireless devices 105-108, if any of the remote wireless devices 105-108 is not registered upon detection of one of the remote wireless devices 105-108, the controller logic 402 will alert the respective user 101-104 that their remote wireless device 105-108 is not registered. Upon alerting the user 101-104 that their device 105-108 is not registered, the controller logic 402 will request that the user 101-104 register his/her remote wireless device 105-108 with the site management device 114.

After determining that the wireless remote device 106 is being used by the inspector 102 based upon the unique identifier, the controller logic 402 may transmit a message to the inspector 102, e.g., welcoming him to the fielded site. If the inspection was previously scheduled with the site manager, this data may be prepopulated in the inspector data 413. In addition, the site manager 104 may have additional information that he/she desires to share with the inspector upon his/her arrival at the fielded site. In such a scenario, the site manager 104 may have previously drafted a message for the particular inspector, which the off-site computing device control logic 602 transmits to the site management device 114. Thus, upon arrival, the controller logic 402 transmits the message to the wireless remote device 106 of the inspector 102.

In one embodiment, the inspector's wireless remote device 106 comprises data indicative of an inspection form. In one embodiment, a legacy application (not shown) displays to the output device 506 data indicative of the form. In another embodiment, the remote device control logic 502 is configured to retrieve data indicative of the form from the memory 501 of the wireless remote device 106 and display data indicative of the form to the output device 506.

Using the input device 507, the inspector 102 performs an inspection of the particular facet of the fielded site, and records the results of the inspection in the form displayed. Upon completed, for example if the inspector selects and input indicating completion or the form is completely filled out, the remote device control logic 502 transmits the data indicative of the form to the site management device 114. Upon receipt, the controller logic 402 stores the data received as inspector data 413. Simultaneously therewith, the controller logic 402 may further analyze the data indicative of the form. If analysis indicates that one or the entire inspection fails, the controller logic 402 creates an alert notification that the controller logic 402 transmits to the site off-site computing device 112 and/or the site manager's handheld 108.

The vendor 103 (FIG. 1A) also has a wireless remote device 107 (FIG. 1A). A visit by the vendor to the fielded site may have been prearranged with the site manager or the vendor may show up to the fielded site in an effort to sell goods or services. As note hereinabove, if the vendor 103 is not registered, the controller logic 402 will request that the vendor 103 register with the site management device 114 (FIG. 1A).

In the event that the visit was prearranged with the site manager and the remote device control logic 502 has been installed on his wireless remote device 107, when the vendor enters the wireless area of the wireless network 110, the controller logic 402 requests the vendor's unique identifier. If none is sent or an incorrect one is sent, the controller logic 402 requests that the end user 101-104 register. If the vendor has preregistered, the remote device control logic 502 transmits a message to the site management device that comprises his/her unique identifier and a timestamp.

Note that in one embodiment, the site manager 104 has already created a purchase order for a particular good or service, which the off-site computing device control logic 602 transmits to the site management device 114. In the alternative, the vendor 103 may estimate a job, and the remote device control logic 502 generates a quote, then the vendor transmits to the site management device 114. Upon receipt, the controller logic 402 stores the quote in the vendor data 412 and transmits the quote to the off-site computing device 112 via the network 111 or to the site manager's wireless remote device 108.

Upon receipt or some time thereafter, the site manager 104 may sign (either manually or electronically) the purchase order. The executed purchase order may be sent to the site management device 114, and the controller logic 402 may deliver the executed purchase order to the wireless remote device 107 of the vendor 103. In another embodiment, the site manager may hand deliver, email, or otherwise provide the purchase order to the vendor 103 or the vendor's handheld 107.

Upon receipt of the purchase order, the vendor 103 then delivers the goods or services to the fielded site. Upon delivery, the vendor 103 may invoice the site manager by generating a preformatted invoice that the remote device control logic 502 displays to the output device 506 upon request via a GUI by the vendor 103. The remote device control logic 502 transmits the generated or filled out invoice to the site management device 114.

Upon receipt of the data indicative invoice, the controller logic 402 stores the data as vendor data 412. In addition, the controller logic 402 Upon analyzes the invoice data received, and if the controller logic 602 determines that the data represents an invoice, the controller logic 402 transmits the data indicative of the invoice to the off-site computing device 112 via the network 111 in the form of an alert notification that is displayed to the off-site computing device 112 and/or to the wireless remote device 108 of the site manager 104.

In one embodiment, upon receipt of the data indicative of the invoice, the off-site computing device control logic 602 analyzes the data received. If the off-site computing device control logic 602 determines that the data is an invoice, the off-site computing device control logic 602 retrieves the debit amount from the invoice, and enters the data into an accounting system as an outstanding debt. Further, the off-site computing device control logic 602 may be configured to automatically direct deposit the payment of the invoice to the vendor's back account, for which the information has been previously entered.

In one embodiment the video devices 403 (FIG. 4) are in the main camera unit 303. The video devices 403 are communicatively coupled to the controller logic 402. Thus, the controller logic 402 controls the movement of the video devices 403 and the video captured by the video devices 403. In this regard, the main camera unit 303 is communicatively coupled to the controller logic 402, and the controller logic 402 may transmit data to the off-site computing device 112 (FIG. 1).

In one embodiment, the main camera unit 303 further comprises a sensor (not shown), which can detect sound, video, infrared, pressure, and/or vibration or any other type of detection known in the art or future-developed. At night when no contractors, vendors or inspectors are to be at the fielded site, the controller logic 402 places the main camera unit in a mode wherein if movement occurs within the field-of-view of the main camera unit 303, moves with its pan-tilt-zoom mechanism, by either hardware, software or a combination there of or the like, to focus on the area in the field-of-view that motion was detected. If motion is detected at a time when no contractors, inspectors, or vendors are to be present at the fielded site, the controller logic 402 may send an alert notification to the off-site computing device 112 and/or the wireless remote device 108 of the site manager 104. In another embodiment, the controller logic 402 may place a call to a security service and/or the like. The security service automatically reports possible trespass on the fielded site.

During operation, the main camera unit 303 may record the fielded site twenty-four hours a day in one embodiment. The controller logic 402 receives the image data from the main camera unit 303, and stores the data as video data 416, either in video and/or still frames. At any time, the site manager 104 may connect to the site management device 114 and the controller logic 402 can stream in real time the video data being received from the main unit camera 303.

In another embodiment, the site management system 100 further comprises one or more remote cameras (not shown) that are strategically placed on the fielded site. Via the radio transceiver 408, the remote cameras may also communicate with the site management device 114. In such an embodiment, the video data 416 from the main camera unit 303 and additional video data from differing perspective of the fielded site, also stored as video data 416, may be analyzed by the controller logic 402 to determine if a possible theft is occurring.

Figure 7:
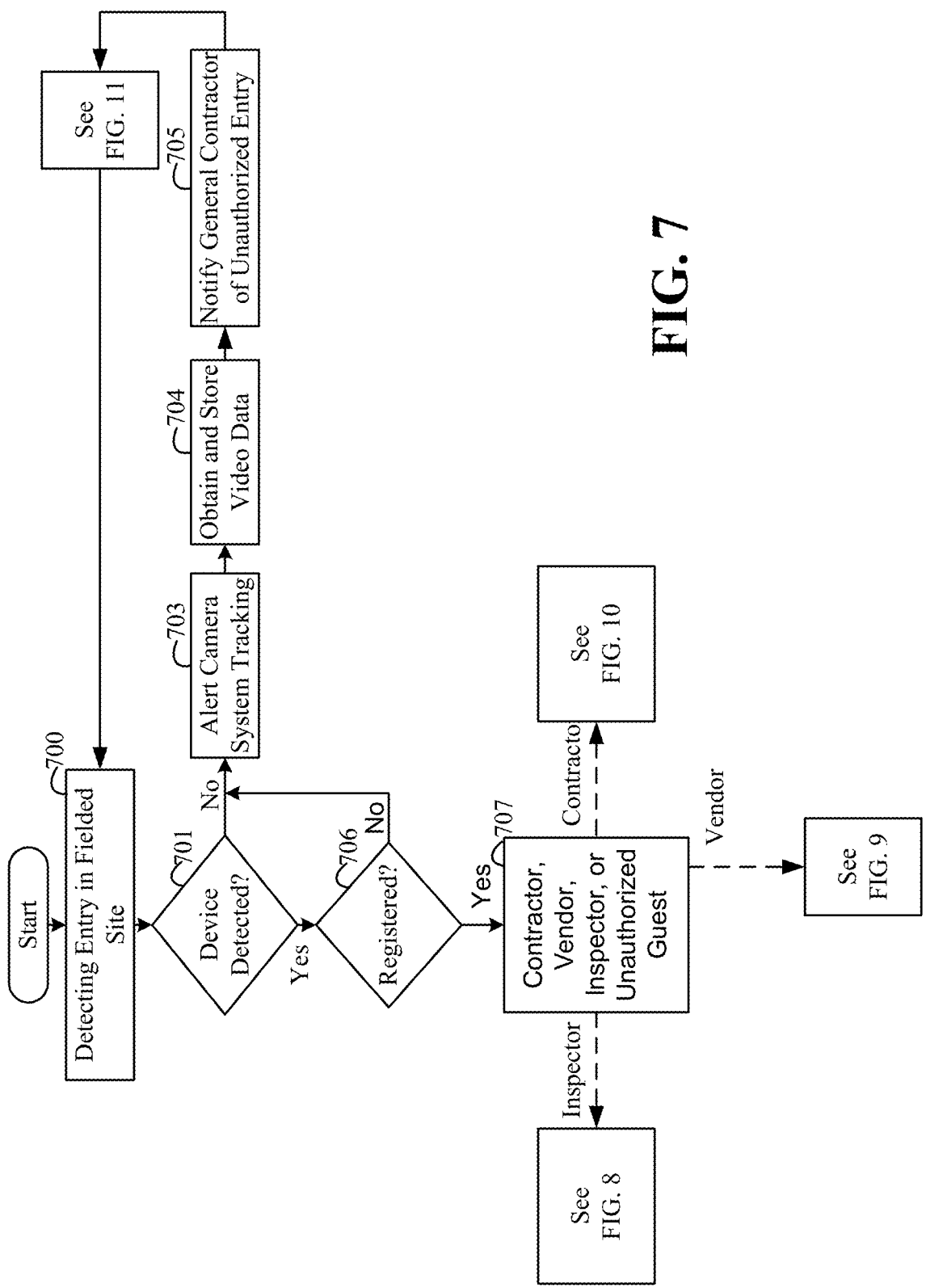
FIG. 7 is a flowchart depicting exemplary architecture and functionality of the controller logic of the controller unit as depicted in FIG. 4 in accordance with an embodiment of the present disclosure.

FIG. 7 is a flowchart of the architecture and functionality of controller logic 402 (FIG. 4) of the site management device 115 (FIG. 4) as depicted in FIG. 4 in accordance with an embodiment of the present disclosure. The following operation of the controller logic 402 is exemplary, and the steps associated with the controller logic 402 may be performed in the order shown or a differing order in other embodiments.

In step 700, a motion sensor 440 or a motion detection device on the video device 403 detects motion on a fielded site. Upon sensing motion, the controller logic 402 determines if a device is detected in 701. In this regard, the controller logic 402 may send a data indicative of a handshake operation, and may wait for a response from a remote wireless device 105-108 (FIG. 1A). When motion is detected but no response is received from a device, the controller logic 402 activates the camera system tracking in step 703. In addition, the controller logic 402 obtains and stores video data in 704 and notifies the general contractor of unauthorized entry on the fielded site in 705, and may send notices to the guest warning of unauthorized entry and potential registration 705. Unauthorized guests are further described in FIG. 11.

Figure 11:
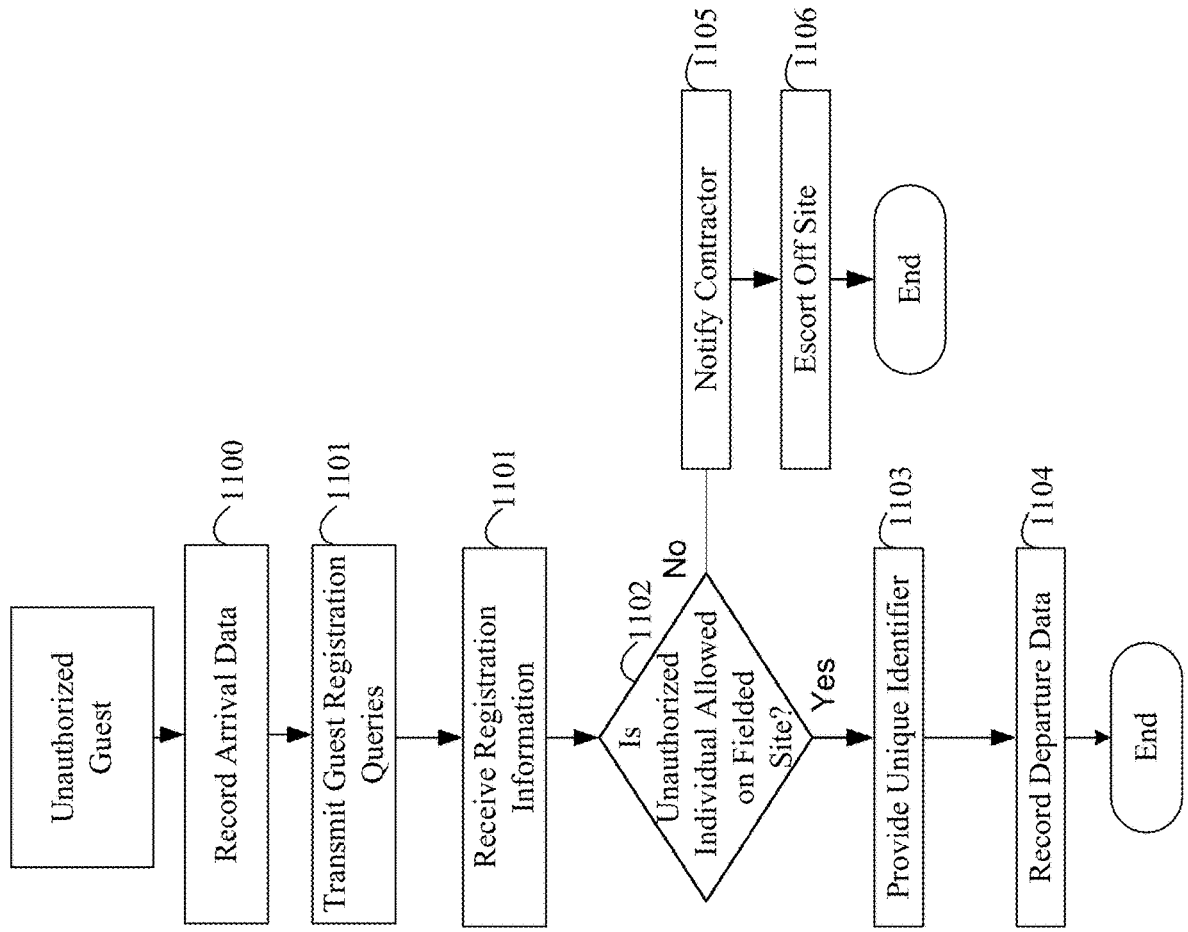
FIG. 11 is a flowchart depicting exemplary architecture and functionality of the controller logic of the controller unit depicted in FIG. 4 relating to an unauthorized guest on a fielded site.

In FIG. 11, the controller logic 402 determines if there is an authorized guest. For example, the controller logic 402 may receive an identifier from the unauthorized user's handheld device. The controller logic 402 may determine by searching authorized users that the individual is not authorized. Further, the controller logic 702 may attempt to communicate with the unauthorized individual through his handheld device in step 1100.

In step 1101, the controller logic 402 transmits registration queries to the unauthorized user in an attempt to register the individual. Based upon the information received in step 1101 from the queries, the controller logic 402, through use of artificial intelligence, may determine that the individual is unauthorized in step 1102.

If the individual is not allowed on the fielded site in step 1102, the controller logic 402 notifies the contractor in step 1105. The contractor organizes a means of escorting the individual off the fielded site.

If the unauthorized individual is allowed on the fielded site in step 1102, the controller logic 1103 provides the individual a unique identifier in step 1103. Thus, the controller logic 402 can record departure data in step 1104 of the individual.

When the controller logic 402 detects a wireless remote device in the wireless area (that area the extent of which is covered by the wireless network 110 (FIG. 1A)), i.e., handshake data is received from the wireless remote device, the controller logic 402 (FIG. 4) determines if the wireless remote device 105-108 is registered with the system 100 (FIG. 1A) in step 706. In this regard, if the handshake data received comprises data indicative of a user that has pre-registered with the system 100.

If the remote device 105-108 has not previously registered, the controller logic 402 proceeds to steps 703, 704, and 705. If the controller logic 402 determines that the remote device 105-108 is registered, the controller logic 402 determines if the registered remote device 105-108 indicates a contractor, a vender, or an inspector in 707.

In one embodiment, the controller logic 402 analyzes data transmitted by the wireless remote device 105-108 by comparing the data sent by the wireless remote device 105-108 to the vendor data 416 (FIG. 4), the inspector data 413, and the contractor data 414. Based upon the comparison, the remote device 106-108 may be correlated with a contractor 101, and inspector 102, or a vendor 103.

Figure 8:
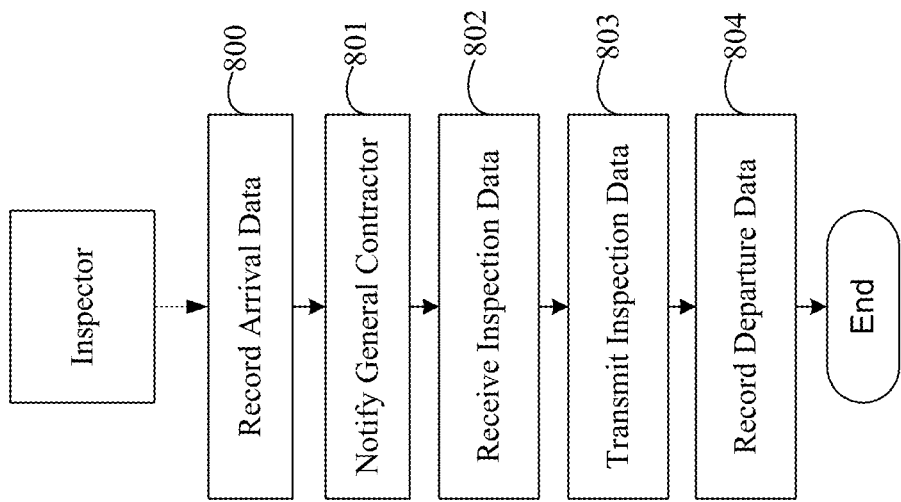
FIG. 8 is a flowchart depicting exemplary architecture and functionality of the controller logic of the controller unit as depicted in FIG. 4 in accordance with an embodiment of the present disclosure for inspectors.

If the data received indicates an inspector, the controller logic 402 proceeds to the flowchart depicted in FIG. 8. The controller logic 402 records the arrival data, which may include the day and time of arrival, of the inspector in 800. The controller logic 402 may notify the general contractor in 801 that the particular person, i.e., the contractor 101, the inspector 102, or the vendor 103 has entered the fielded site.

FIG. 8 depicts the architecture and functionality of the controller logic 402 when the controller logic 402 determines that the person who has entered the fielded site is an inspector.

Note that the inspector may be present in the fielded site to make an inspection of a particular aspect of the structure being built. In this regard, the inspector 102 (FIG. 1A) enters data into his remote device 106 (FIG. 1A), which the remote device transmits to the controller unit 115 (FIG. 1A). The inspection data is received in 802 by the controller unit 115, and the controller logic 402 transmits the inspection data to the off-site computing device 112 (FIG. 1A) and/or to the site manager's remote device 108 in 803.

Once the inspector 102 has completed his inspection, controller unit 115 requests inspector device 106 to submit inspection results to controller unit 115, as he/she may then exit the fielded site. In response to no longer being connected locally to the remote device 106, the controller logic 402 may then record departure data in 804. In another embodiment, the inspector 102 may affirmatively enter data into his/her remote device 106 when he/she is leaving the fielded site. The remote device 106 may transmit the inspection data and departure data to the controller unit 115, and the control logic 402 records the inspection in 802 and departure data in 804.

Figure 9:
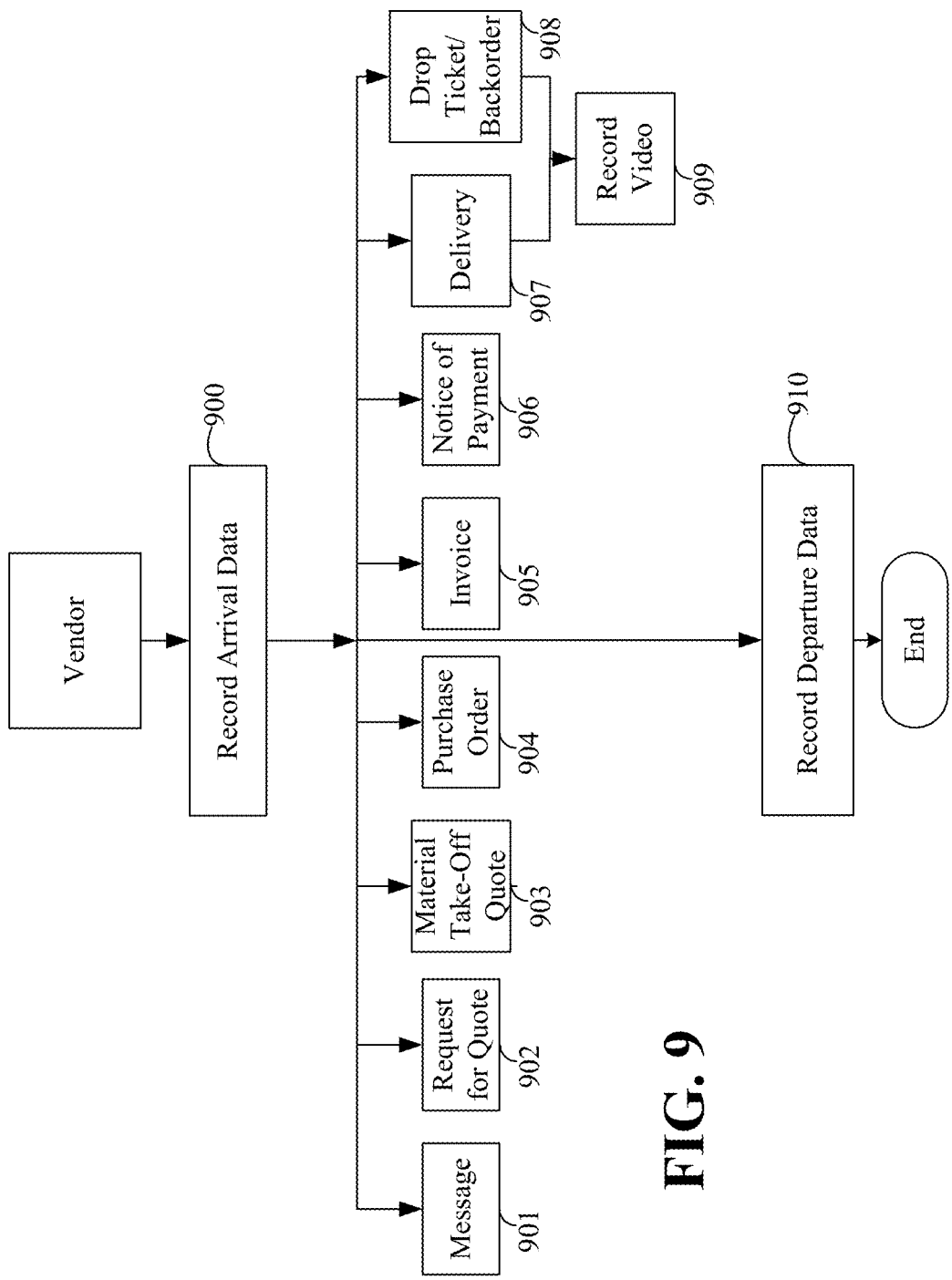
FIG. 9 is a flowchart depicting exemplary architecture and functionality of the controller logic of the controller unit depicted in FIG. 4 in accordance with an embodiment of the present disclosure for vendors.

In regard to FIG. 7, the controller logic 402 (FIG. 4) may determine that a vendor has entered the fielded site in 707. FIG. 9 depicts the architecture and functionality of the controller logic 402 when a vendor has entered the fielded site.

In 900, the controller logic 900 records the arrival data in 900. This arrival data may be, for example, data indicative of the day and time the vendor 103 (FIG. 1A) enters the fielded site. The controller logic 402 may obtain this data automatically when the vendor's remote device 107 is detected by the controller logic 402 or the vendor may affirmatively enter data into his/her remote device 106 that is then transmitted to the controller unit 115 (FIG. 1A).

There are a variety of operations that may be performed in regards to the vendor 103 being present on the fielded site. These functions may occur simultaneously or over a period of time. These operations are now described.

In 901, the site manager 104 may desire to send a message to the vendor upon his/her presence at the fielded site. In this regard, the site manager 104 enters data indicative of the vendor and the message into his/her remote device 108 (FIG. 1A). Upon the vendor's arrival to the fielded site, the controller unit 115 identifies the vendor by the handshake data provided upon entry or via the vendor entering identifying data and transmitting the data to the controller unit 115. In response, the controller logic 402 transmits data indicative of the message to the vendor's remote device 107.

The site manager 104 may desire to receive a quote from the vendor. If so, the controller logic 402 transmits data indicative of a request for quote (RFQ) previously provided by the site manager 104 to the vendor's remote device 107.

In response to the RFQ, the vendor 103 may enter data indicative of a material take-off (MTO) quote into the vendor's remote device 107 in 903. The remote device 107 transmits the data indicative of the MTO to the controller unit 115, and the controller logic 402 stores the data. In addition, the controller logic 402 transmits data indicative of the MTO quote to the site manager's remote device 108 and/or the off-site computing device 112.

After reviewing the MTO quote, the site manager 104 may desire to issue a purchase order (PO) in 904. Thus, the site manager 104 enters data indicative of a PO into the remote device 108 and/or the off-site computing device, which is transmitted to the controller unit 115. Note that the PO may be automatically transmitted upon completion of the PO, or the controller logic 402 may request the PO.

In 905, the vendor 103 may desire to invoice the site manager 104. The vendor 103 enters data indicative of an invoice in the remote device 107. Automatically or upon request, the remote device 107 transmits the data indicative of the invoice to the controller unit 115. Upon receipt (or upon request by the site manager 104), the data indicative of the invoice is transmitted to the site manager's remote device 108 and/or the off-site computing device 112 (FIG. 1A).

In 906, the site manager 104 may desire to notify the vendor 103 of payment. Thus, the site manager 104 enters data indicative of the notice of payment into the remote device 108 (or the off-site computing device 112), which the remote device 108 transmits to the controller unit 115. Upon receipt, the control logic 402 transmits the data indicative of the notice to the vendor remote device 107.

In response to notice of delivery received by the remote device 107, the control logic 402 activates the video device 403 (FIG. 4), positions the camera based upon data indicative of the area where the delivery will be made (or activates a camera in proximity to the delivery). The video device 403 captures video data 416 (FIG. 4) indicative of the delivery in 909. Thus, while being delivered or at a later time, the control logic 402 may transmit the video data indicative of the delivery to the site manager's remote device 108 and/or the off-site computing device 112.

In 908, the vendor 103 may submit data indicative of a drop ticket, i.e., the goods have been delivered. The data is transmitted to the controller unit 115, and the control logic 402 may transmit data indicative of the drop ticket to the site manager's remote device 108 and/or the off-site computing device 112. Note that the goods may be on backorder. Thus, the data may include data indicative of a backorder on the goods to be delivered.

Note that the video capture of a delivery and a drop ticket may be combined. In this regard, each delivery should have an electronic drop ticket or invoice of delivered material and should have back ordered items, if any, included.

When the vendor 103 leaves the fielded site at any time during the course of the operations described, the control logic 402 records data indicative of the vendor's departure in 910. Note that the vendor's remote device 107 may automatically transmit departure data to the controller unit 115 or the controller logic 402 may automatically detect that the vendor 103 has left the fielded site.

Figure 10:
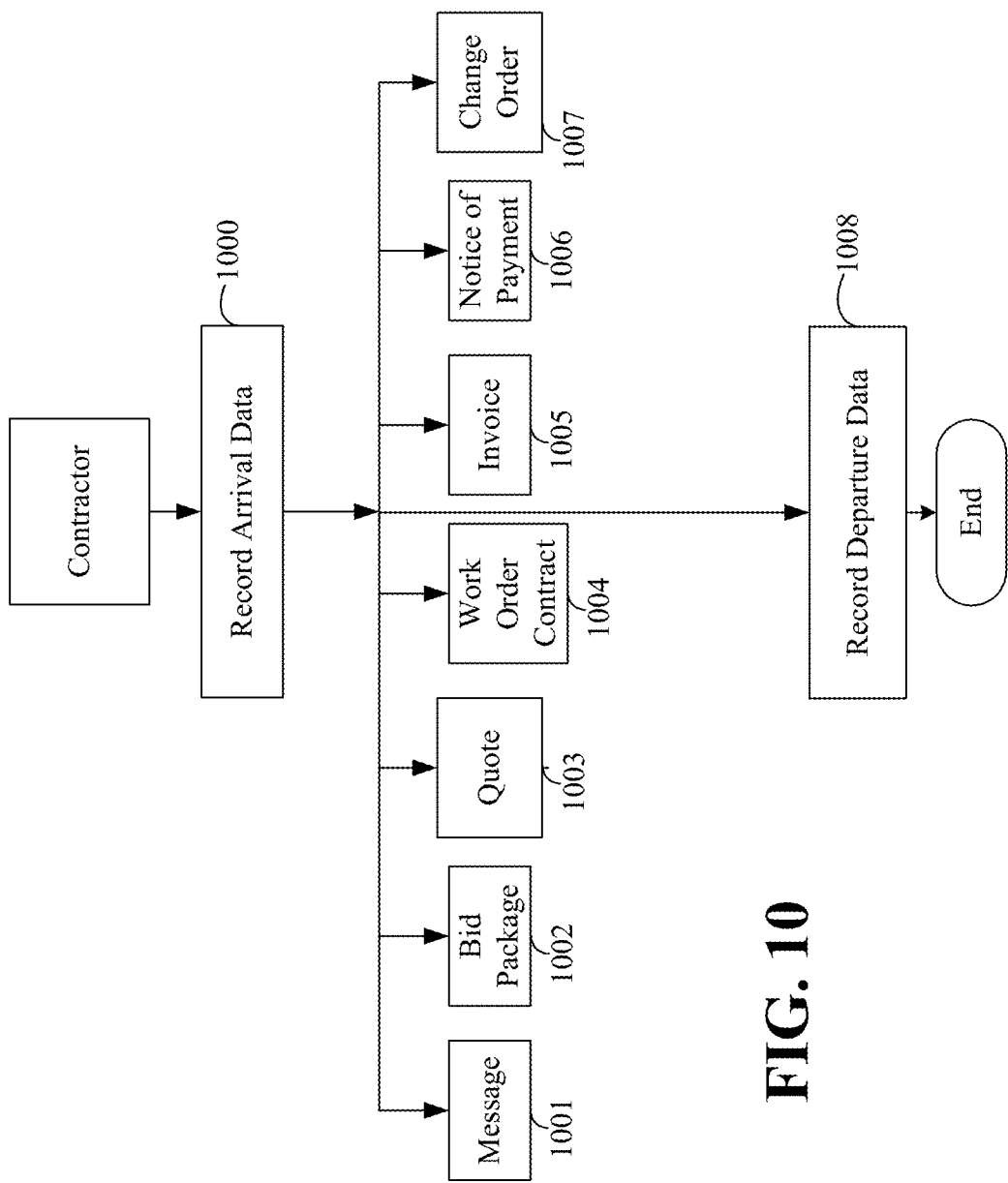
FIG. 10 is a flowchart depicting exemplary architecture and functionality of the controller logic of the controller unit depicted in FIG. 4 in accordance with an embodiment of the present disclosure for contractors.

In regards to FIG. 7, the controller logic 402 (FIG. 4) may determine that a contractor has entered the fielded site in 707. FIG. 10 depicts the architecture and functionality of the controller logic 402 when a vendor has entered the fielded site.

In 1000, the controller logic 402 records the arrival data. This arrival data may be, for example, data indicative of the day and time the contractor 101 (FIG. 1A) enters the fielded site. The controller logic 402 may obtain this data automatically when the contractor's remote device 105 (FIG. 1A) is detected by the controller logic 402 or the contractor may affirmatively enter data into his/her remote device 105 (FIG. 1A) that is then transmitted to the controller unit 115 (FIG. 1A).

There are a variety of operations that may be performed in regards to the contractor 101 being present on the fielded site. These functions may occur simultaneously or over a period of time. These operations are now described.

In 1001, the site manager 104 (FIG. 1A) may desire to send a message to the contractor 101 upon his/her presence at the fielded site. In this regard, the site manager 104 enters data indicative of the contractor 101 and the message into his/her remote device 108 (FIG. 1A), which is transmitted to the controller unit 115. Upon the contractor's arrival to the fielded site, the controller unit 115 identifies the contractor by the handshake data provided upon entry or via the contractor 101 entering identifying data and transmitting the data to the controller unit 115. In response, the controller logic 402 transmits data indicative of the message to the contractor's remote device 105.

The site manager 104 (FIG. 1A) may desire to transmit a bid package to the contractor. If so, the site manager 104 enters data indicative of the bid package into the remote device 108 (FIG. 1A), which the remote device 108 transmits to the controller unit 115. The controller logic 402 transmits data indicative of the bid package to the contractor's remote device 105.

In response to the bid package, the vendor 103 may enter data indicative of a quote into the contractor's remote device 105 in 1003. The remote device 105 transmits the data indicative of the quote to the controller unit 115, and the controller logic 402 stores the data. In addition, the controller logic 402 transmits data indicative of the quote to the site manager's remote device 108 and/or the off-site computing device 112.

After reviewing the quote, the site manager 104 may desire to issue a work order (WO) in 1004. Thus, the site manager 104 enters data indicative of a WO into the remote device 108 and/or the off-site computing device 112, which is transmitted to the controller unit 115. Note that the WO may be automatically transmitted upon completion of the WO, and/or the controller logic 402 may request the WO.

In 1005, the contractor 101 may desire to invoice the site manager 104. The contractor 101 enters data indicative of an invoice in the remote device 105. Automatically or upon request, the remote device 107 transmits the data indicative of the invoice to the controller unit 115. Upon receipt (or upon request by the site manager 104), the data indicative of the invoice is transmitted to the site manager's remote device 108 and/or the off-site computing device 112 (FIG. 1A).

In 1006, the site manager 104 may desire to notify the contractor 105 of payment. Thus, the site manager 104 enters data indicative of the notice of payment into the remote device 108 (or the off-site computing device 112), which transmits to the controller unit 115. Upon receipt, the control logic 402 transmits the data indicative of the notice to the contractor's remote device 105.

Note that during the job by the contractor, there may arise a circumstance wherein the work to be done changes. In such a scenario, the site manager 104 may enter data indicative of a change order (CO) into the remote device 108 or the off-site computing device 112. The data indicative of the changes order is transmitted to the controller unit 115. In response to receipt, the control logic 402 transmits data indicative of the CO to the contractor's remote device 105.

When the contractor 101 leaves the fielded site at any time during the course of the operations described, the control logic 402 records data indicative of the contractor's departure in 1008. Note that the contractor's remote device 105 may transmit departure data indicative of work completed, status of remaining work to complete, etc. to the controller unit 115 or the controller logic 402 may automatically detect that the contractor 101 has left the fielded site.

What I claim is:

1. A fielded construction site management system, comprising:
    a portable construction site management device that is configured to be a unitary component secured temporarily on a first fielded construction site and is configured to be moved to a second fielded construction site upon completion of a build on the first fielded construction site, the portable construction site management device configured to collect data and provide resources to one or more fielded sites, the portable construction site management device comprising a controller unit that integral with a temporary metered power provision unit connected to a split-phase 240/120-Volt entrance via a conductor cable from an electric utility and delivering power to a distributive load center for energizing multiple circuits, the distributive load center integral with controller unit and the temporary metered power provision unit, the distributive load center configured to provide power to one or more receptacles to provide power to power tools, the receptacles integral with the controller unit and the distributive load center;
    a wireless network integral with the controller unit, the temporary metered power provision unit, the distributive load center, and the receptacles, the wireless network configured to communicatively couple to a plurality of on-site remote devices used by contractors working on the first fielded construction site when the plurality of on-site remote devices are within communication range of the wireless network;

a camera integral with the wireless network, the controller unit, the temporary metered power provision unit, the distributive load center, and the receptacles, the camera configured to monitor the first fielded construction site, record data indicative of photographs of the first fielded construction site, wherein the camera is communicatively coupled to the plurality of remote devices for use by the general contractor and site managers for remote viewing of the first fielded construction site;

a plurality of off-site computing devices communicatively coupled to the portable construction site management device; and a processor on the controller unit, the processor configured for communicatively coupling with the plurality of on-site remote devices on the first fielded construction site used by the multiple and various trades when a plurality of on-site remote devices are detected by the controller unit, the processor further configured for receiving data indicative of a unique identifier identifying the contractors based on data received from the contractor's on-site remote device on the first fielded construction site and determining whether the unique identifier correlates with a permissible on-site remote device of the contractor who is permissively on the first fielded construction site, the processor further configured for controlling the first fielded construction site by transmitting data indicative of the contractor and data indicative of whether the contractor is permissively on the first fielded construction site to the off-site computing device or to a site manager's off-site remote device, the processor further configured for managing the build on the first fielded construction site by enabling communication of construction data related to the build to/from a plurality of off-site remote devices, wherein construction data transmitted and/or received by the processor comprises data indicative of project management data, build plans, bids, change orders, schedules, estimates, material deliveries and/or back orders, budgets, purchase orders, material pricing, invoicing, payables, inspection data including pass/fail data, write-up details and stop work orders, security data including remote site viewing data, access authorization and/or verification, and theft deterrence, and/or marketing data including plans, finishes, and sales pricing.

2. The system of claim 1, wherein the processor is further configured for determining the validity of the unique identifier, and when the unique identifier is valid, the processor is configured for assigning a first timestamp to the unique identifier and storing the unique identifier on the portable construction site management device.

3. The system of claim 2, wherein the processor is further configured for receiving the unique identifier, assigning a second timestamp to the unique identifier, storing the unique identifier on the portable construction site management device, and transmitting the unique identifier and the second timestamp to the off-site computing device or the site manager's off-site remote device.

4. The system of claim 1, wherein the portable construction on-site management device is further configured for determining performance of a subcontractor or other worker on the first fielded site and for purposes of determining pay of the subcontractor or other worker based on performance details related to the build on the first fielded construction site based upon the first timestamp and the second timestamp.

5. The system of claim 1, wherein the processor is further configured for detecting a power disconnect of the power provision unit and activating a battery for providing power to the portable construction on-site management device to ensure the portable construction on-site management device remains operational for the duration of a power outage or the duration of the battery (UPS) life, whichever comes first.

6. The system of claim 1, wherein the processor is further configured for storing and transmitting data indicative of a notification of the presence of the contractor on the first fielded construction site wherein the notification indicates whether the contractor is authorized on the first fielded site or not.

7. The system of claim 1, wherein the at least one camera continuously or periodically monitors a first field of view, and data indicative of video captured by the camera is transmitted to the processor.

8. The system of claim 7, wherein during a pre-defined time range, the processor is further configured for determining if there is movement in the first field of view, and when there is movement, the processor is further configured for processing and transmitting a notification of movement to the off-site computing device or the site manager's off-site remote device.

9. The system of claim 1, further comprising at least one motion sensor communicatively coupled to the processor, wherein the motion sensor is configured for detecting movement on the first fielded construction site within a particular area that is similar to the first field of view.

10. The system of claim 9, wherein the processor is configured for transmitting a notification to the off-site computing device when data is received from the motion sensor indicating that motion is detected.

11. The system of claim 10, wherein the processor is further configured for transmitting a notification to any off-site remote device when movement is detected by the motion sensor.

12. The system of claim 9, wherein when movement is detected by the camera, the processor is configured for activating one or more other cameras and providing the camera's location data of the movement, and in response, the other cameras may be configured for moving to capture a secondary field of view relative to the movement detected.

13. The system of claim 1, further comprising a global positioning system (GPS), wherein the GPS may be configured for capturing location data of the first fielded construction site, the location data defining the boundaries of the first fielded construction site.

14. The system of claim 13, wherein the portable construction site management device is communicatively coupled to the off-site computing device and is communicatively coupled to the plurality of on-site remote devices, the plurality of on-site remote devices configured to transmit GPS data to the portable construction site management device, the portable construction site management device is further configured for determining whether one or more of the on-site remote devices is within the boundaries of the first fielded construction site based upon the location data and the GPS data received from the plurality of on-site remote devices and the portable construction site management device is communicatively coupled to the off-site computing device or the site manager's off-site remote device that is configured for displaying data, based upon the location data and the GPS data received from the plurality of site remote devices, the location data and the GPS data indicative of a location of each of the remote devices relative to the first fielded construction site.

15. The system of claim 1, wherein the processor is further configured for video coupling the contractor on the first fielded construction site with one or more off-site computing devices or one or more off-site remote devices.

16. The system of claim 1, wherein the processor is further configured for detecting entry of at least one of the on-site remote devices in the first fielded construction site, and when at least one of the on-site remote devices is detected, the processor is further configured for determining if the detected on-site remote device is authorized to be on the first fielded site.

17. The system of claim 16, wherein the processor is further configured for determining if the on-site remote device detected transmits data indicative of a trade, an inspector, a contractor, a vendor, or an unauthorized individual based on the absence of data transmitted by their respective on-site remote devices or the absence of a remote device of any kind.

18. The system of claim 17, wherein when the on-site remote devices transmit data indicative of an inspector, the processor is further configured for recording the inspector's arrival date and may notify the off-site computing device or the site manager's off-site remote device that an inspector is at the first fielded construction site.

19. The system of claim 18, wherein the processor is further configured for receiving inspection data from the detected on-site remote device that transmitted data indicative of an inspector, transmitting inspection data indicative of an inspection by the detected on-site remote device to the site management device, and/or the site manager's off-site remote device or the off-site computing device, and recording data indicative of the inspector's departure.

20. The system of claim 17, wherein when the detected on-site remote device transmits data indicative of a subcontractor, the processor is further configured for recording the subcontractor's arrival data and may notify the site manager's off-site remote device or the off-site computing device that the subcontractor is at the first fielded construction site.

21. The system of claim 17, wherein when a vendors on-site remote device transmits data indicating a vendor, the processor is further configured for recording the vendor's arrival data and may notify the site manager's off-site remote device or the off-site computing device that the vendor is at the first fielded construction site.

22. The system of claim 21, wherein the processor is further configured for performing a function selected from the group comprising: (1) delivering or receiving a message to/from the vendor or the site manager's off-site remote device or the off-site computing device; (2): receiving a request for quote and transmitting data indicative of the request to the vendor by the site manager's off-site remote device or the off-site computing device; (3) recording data indicative of a material take-off quote and transmitting the data to the site manager's off-site remote device or the off-site computing device; (4) receiving data indicative of a purchase order and transmitting the purchase order data to the vendor by the site manager's off-site remote device or the off-site computing device; (5) invoicing the off-site computing device and/or an off-site mobile device; (6) transmitting data indicative of a notice of payment to the vendor by the site manager's off-site remote device or the off-site computing device; (7) recording data indicative of material delivery by the -site manager's off-site remote device or the off-site computing device; (8) capturing video indicative of a material delivery by the site management device; and (9) transmitting data indicative of a drop ticket or back order to the site manager's off-site remote device or the off-site computing device.

23. A construction site management method, comprising:
installing a portable construction site management device that is configured to be a unitary component secured temporarily at a first fielded construction site and configured for moving to a second fielded construction site upon completion of a build on the first fielded construction site;
receiving power, by a temporary metered power provision unit energized by a split-phase 240/120-Volt entrance on the portable construction site management device and integral with a controller unit contained in the portable construction site management device installed on the first fielded construction site, via a conductor cable from an electric utility;
delivering power to a distributive load center configured for energizing one or more circuits, the distributive load center integral with the temporary metered power provision unit and the controller unit;
delivering power, by the distributive load center, to one or more receptacles integral with the temporary metered power provision unit, the controller unit, and the distributive load center, the power utilized during the initial phase of construction of a build on the first fielded construction site;
utilized during the permanent electric service phase and during the final construction phase, remodeling phase and marketing phase of a dwelling whereas the site management device may be located in a construction site dwelling, the site management device comprising a controller unit integral with an unmetered power provision unit energized by a 120-Volt installed via surface mount, pedestal, or a structure, utilized during the permanent electric service phase of an unoccupied dwelling;
communicatively coupling a plurality of remote devices used by contractors working at the first fielded construction site to the portable construction site management device over a wireless network when the plurality of on-site remote devices are within communication range of the wireless network, such on-site remote devices to which the site management device may communicate include, computers, laptops, handheld devices (cell phones), tablets, autonomous drones, robotics, and the like, the wireless network integral with the controller unit, the temporary metered power provision unit, the distributive load center, and the receptacles;
monitoring the first fielded construction site by a camera integral with the controller unit, the temporary metered power provision unit, the distributive load center, and the receptacles;
recording data indicative of photographs of the first fielded construction site, wherein the camera is communicatively coupled to the plurality of remote devices for use by contractors for remote viewing of the first fielded construction site;
coupling one or more off-site computing devices to the portable construction site management device;
coupling, by the portable construction site management device, with one or more of the plurality of on-site remote devices on the first fielded construction site when one or more of the plurality of on-site remote devices are detected by the controller unit;

receiving, by a processor residing on the controller unit, data indicative of a unique identifier from a plurality of on-site remote devices, the unique identifier identifying one of the contractors based on data received from the contractor's on-site remote device;

determining, by the processor, whether the unique identifier correlates with a permissible on-site remote device of the contractor who is permissively on the first fielded construction site;

controlling the first fielded construction site by transmitting, by the processor, data indicative of the contractor and data indicative of whether the contractor is permissively on the first fielded construction site to an off-site computing device or to a site manager's off-site remote device; and managing a build on the first fielded construction site by enabling communication of construction data related to the build to/from a plurality of off-site remote devices or the off-site computing device and to/from the on-site remote devices through the portable construction site management device, the construction data being data indicative of project management data, build plans, bids, change orders, schedules, estimates, material deliveries and/or back orders, budgets, purchase orders, material pricing, invoicing, payables, inspection data including pass/fail data, write-up details and stop work orders, security data including remote site viewing data, access authorization and/or verification, and theft deterrence, and/or marketing data including plans, finishes, and sales pricing.

24. The method of claim 23, further comprising:
determining, by the processor, the validity of the unique identifier;
when the unique identifier is valid, assigning, by a processor, a first timestamp to the unique identifier; and
transmitting the unique identifier and the first timestamp to the off-site computing device or an off-site manager's remote device.

25. The method of claim 24, further comprising:
receiving, by the processor, the unique identifier upon departure of the contractor from the first fielded construction site;
assigning, by the processor, a second timestamp to the unique identifier;
recording, by the processor, the unique identifier and the second timestamp; and
transmitting, by the processor, the unique identifier and the second timestamp to the off-site computing device or the off-site manager's remote device.

26. The method of claim 25, further comprising determining performance of a subcontractor or other worker on the first fielded site and determining equitable draw of the subcontractor or other worker based on performance details related to a build task on the first fielded construction site based upon the first timestamp and the second timestamp over a period of performance.

27. The method of claim 23, further comprising:
detecting, by the processor, when power disconnects to the temporary metered power provision unit; and
activating a battery, by the processor, for provision of power to the portable construction on-site management device to ensure the portable construction on-site management device remains operational for a duration of a power outage or duration of the battery (UPS), whichever comes first.

28. The method of claim 23, further comprising transmitting data indicative of a notification of the presence of the contractor on the first fielded construction site wherein the notification indicates whether the contractor is authorized on the site or not.

29. The method of claim 23, further comprising:
continuously or periodically monitoring, by the camera, a first field of view;
capturing video data indicative of the field of view; and
transmitting, by the processor, video data to the off-site computing device or a site manager's off-site remote device.

30. The method of claim 29, further comprising:
during a pre-defined time-range, determining, by the processor, if there is movement in the first field of view based upon data from a motion sensor; and
when there is movement, transmitting, by the processor, a notification of movement to the off-site computing device or the site manager's remote device.

31. The method of claim 29, further comprising transmitting, by the processor, the notification to the site manager's off-site remote device.

32. The method of claim 31, further comprising
detecting, by a motion sensor communicatively coupled to the processor, movement on the first fielded construction site within a particular area that is similar to the first field of view.

33. The method of claim 32, further comprising transmitting, by the processor, a notification to the off-site computing device or the site manager's off-site remote device when data is received from the motion sensor indicating that motion is detected.

34. The method of claim 33, further comprising transmitting, by a processor, a notification to the site manager's off-site remote device when movement is detected.

35. The method of claim 34, further comprising:
when motion is detected by the camera, activating, by the processor, one or more other cameras;
providing the camera's location data of the movement; and
in response, moving the other cameras to capture a second field of view relative to the movement detected.

36. The method of claim 23, further comprising wherein the portable construction site management device is communicatively coupled to the off-site computing device and a global positioning system (GPS), further comprising capturing, by the GPS, location data of the first fielded construction site, the location data defining the boundaries of the first fielded construction site.

37. The method of claim 36, wherein the off-site computing device may be communicatively coupled to the plurality of on-site remote devices, the plurality of on-site remote devices configured to:
transmit GPS data to the off-site computing device or the site manager's off-site remote device, the off-site computing device and the site manager's off-site remote device configured for determining whether one or more of the on-site remote devices is within the boundaries of the fielded construction site based upon the location data and the GPS data received from the plurality of on-site remote devices; and
displaying data, by the off-site computing device or the site manager's off-site remote device, based upon the location data received and the GPS data received from the plurality of on-site remote devices, the data indicative of a location of each of the plurality of controller units relative to the fielded construction site.

38. The method of claim 23, further comprising, video coupling, by the processor, a worker on the fielded construction site with a remote off-site manager.

39. The method of claim 23, further comprising detecting, by a processor, entry in the fielded construction site; and
when an on-site remote device is detected, determining, by the processor, if the detected on-site remote device is authorized to be on the first fielded site.

40. The method of claim 39, further comprising determining if the on-site remote device detected transmits data indicative of a trade, an inspector, a contractor, a vendor, an authorized individual, or an unauthorized individual based on the data transmitted by their respective on-site remote devices or absence of the on-site remote device.

41. The method of claim 40, wherein when the remote device indicates an inspector, further comprising
recording, by the processor, the inspector's arrival data; and
notifying the off-site computing device or the site manager's off-site remote device that an inspector is at the fielded construction site.

42. The method of claim 41, further comprising
receiving, by the processor, inspection data from an inspector's remote device;
transmitting, by the processor, inspection data indicative of an inspection by the inspector to the site manager's off-site remote device; and
recording, by the processor, data indicative of the inspector's departure.

43. The method of claim 42, wherein when the on-site remote device indicates a subcontractor, further comprising:
recording, by the processor, the subcontractor's arrival data; and
notifying the site manager's off-site remote device or the off-site computing device that the subcontractor is at the first fielded site.

44. The method of claim 43, wherein when the remote device indicates a vendor, further comprising:
recording, by the processor, the vendor's arrival data; and
notifying an off-site manager that the vendor is at the fielded construction site.

45. The method of claim 44, wherein the processor further performs a function selected from the group comprising:
(1) delivering or receiving, by the processor, a message to/from a vendor's on-site remote device or a site manager's off-site remote device or the off-site computing device;
(2) receiving, by the processor, a request for quote and transmitting data indicative of the request to the vendor's on-site remote device;
(3) recording, by the processor, data indicative of a material take-off quote and transmitting the data to the site manager's off-site remote device or the off-site computing device;
(4) receiving, by the processor, data indicative of a purchase order and transmitting the purchase order data to the contractor's on-site remote device and/or off-site remote device;
(5) invoicing, by the processor, the contractor's on-site and/or off-site remote device;
(6) transmitting data indicative of a notice of payment to the contractor's on-site remote device;
(7) recording, by the processor, data indicative of material delivery;
(8) capturing, by the processor, video indicative of the material delivery; and
(9) transmitting, by the processor, data indicative of a drop ticket or back order to the site manager's off-site remote device or the off-site computing device
receiving data indicative of scheduling related to the fielded construction site;
receiving data indicative of daily logs of activity related to the fielded construction site
receiving data indicative of to-do lists related to the fielded construction site;
receiving data indicative of documents and photos related to the fielded construction site;
receiving emails, texts, or push notices related to the fielded construction site; and
receiving data indicative of budgeting related to the fielded construction site.

46. The system of claim 23, wherein the portable construction site management device is configured to communicate building plan data to the plurality of remote devices describing how a dwelling is to be built and communicating plan updates to the plurality of remote devices describing changes or updates to plan data.

47. The system of claim 23, wherein the portable construction site management device or the site manager's off-site remote device determines whether a user of one of the on-site remote devices is present on the first fielded construction site based upon the first timestamp and the second timestamp.

* * * * *